United States Patent [19]

Yamaguchi et al.

[11] Patent Number: 5,079,706
[45] Date of Patent: Jan. 7, 1992

[54] CONTROL SYSTEM FOR SELF-PROPELLED WORKING VEHICLE INCLUDING VEHICLE COURSE CORRECTION MEANS

[75] Inventors: Tetsuo Yamaguchi, Sakai; Katsumi Ito, Osaka; Shigeru Tanaka; Kazuhiro Takahara, both of Osaka, all of Japan

[73] Assignee: Kubota Ltd., Japan

[21] Appl. No.: 479,189

[22] Filed: Feb. 13, 1990

Related U.S. Application Data

[63] Continuation of Ser. No. 118,943, Nov. 10, 1987, abandoned.

[30] Foreign Application Priority Data

Dec. 9, 1986 [JP] Japan .................. 61-293681
Jul. 9, 1987 [JP] Japan .................. 62-171789

[51] Int. Cl.⁵ .............................................. G06F 15/50
[52] U.S. Cl. ..................... 364/424.02; 180/168
[58] Field of Search ............ 364/424, 443, 424.01, 364/424.02; 180/167, 168, 140, 142, 233, 234, DIG. 900; 37/DIG. 1, DIG. 17

[56] References Cited

U.S. PATENT DOCUMENTS

| | | | |
|---|---|---|---|
| 4,328,545 | 5/1982 | Halsall et al. ................ | 364/424 |
| 4,437,533 | 3/1984 | Bierkane et al. ............. | 180/168 |
| 4,463,821 | 8/1984 | Falamak ....................... | 180/168 |
| 4,482,960 | 11/1984 | Pryor ............................ | 364/424 |
| 4,573,547 | 3/1986 | Yoshimura et al. .......... | 180/168 |
| 4,588,041 | 5/1986 | Tsuchihashi .................. | 180/168 |
| 4,603,753 | 8/1986 | Yoshimura et al. .......... | 180/168 X |
| 4,626,995 | 12/1986 | Lofgren et al. .............. | 364/424 |
| 4,628,454 | 12/1986 | Ito ................................. | 180/168 X |
| 4,674,048 | 6/1987 | Okumura ...................... | 364/424 |

*Primary Examiner*—Eugene R. LaRoche
*Assistant Examiner*—Benny Lee
*Attorney, Agent, or Firm*—Cushman, Darby & Cushman

[57] ABSTRACT

A steering control system for a self-propelled working vehicle having steerable front and rear wheels. The control system comprises sensors for detecting a directional or orientation error and a sideways error of the vehicle relative to a reference line or lines extending in a vehicle running direction, and a control unit for steering the vehicle in response to signals received from the sensors. The control unit is capable of steering the vehicle in a turn steering mode for turning the front and rear wheels to the same steering angle in opposite directions and a parallel steering mode for turning the front and rear wheels to the same steering angle in the same direction. When the directional error and the sideways error take place simultaneously, the control unit determines directions and angles for turning the front and rear wheels to correct the two errors simultaneously.

14 Claims, 18 Drawing Sheets

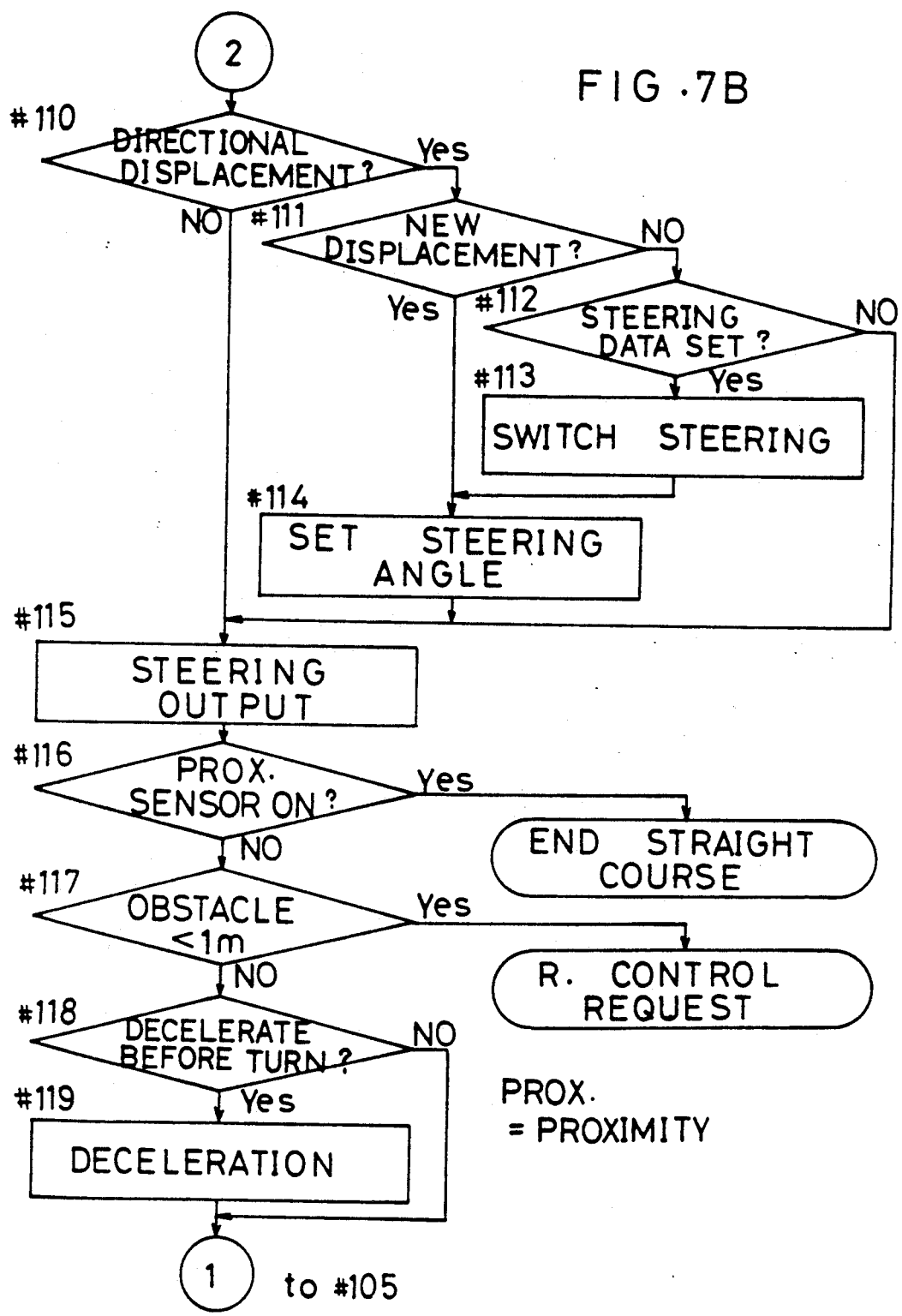

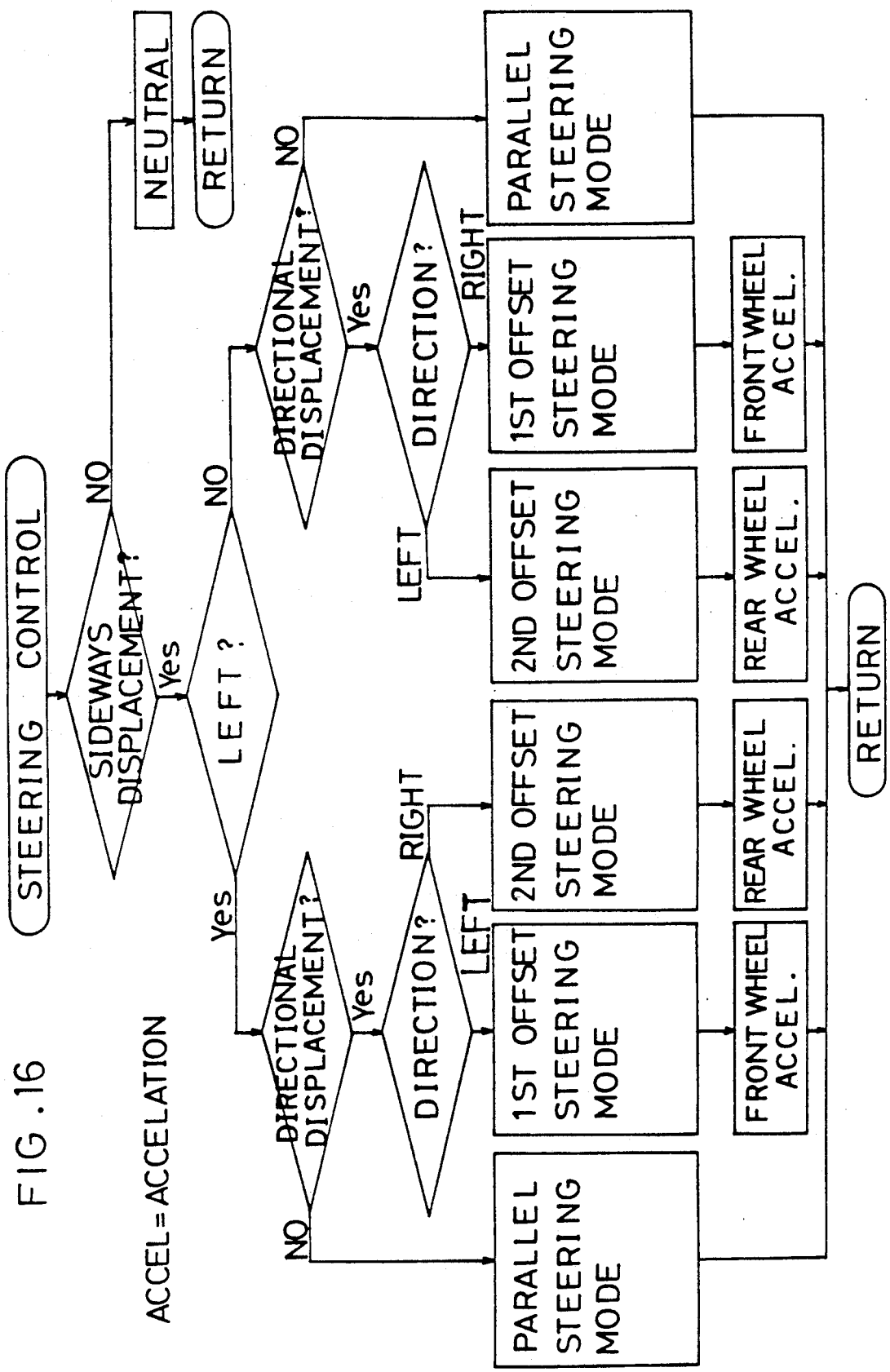

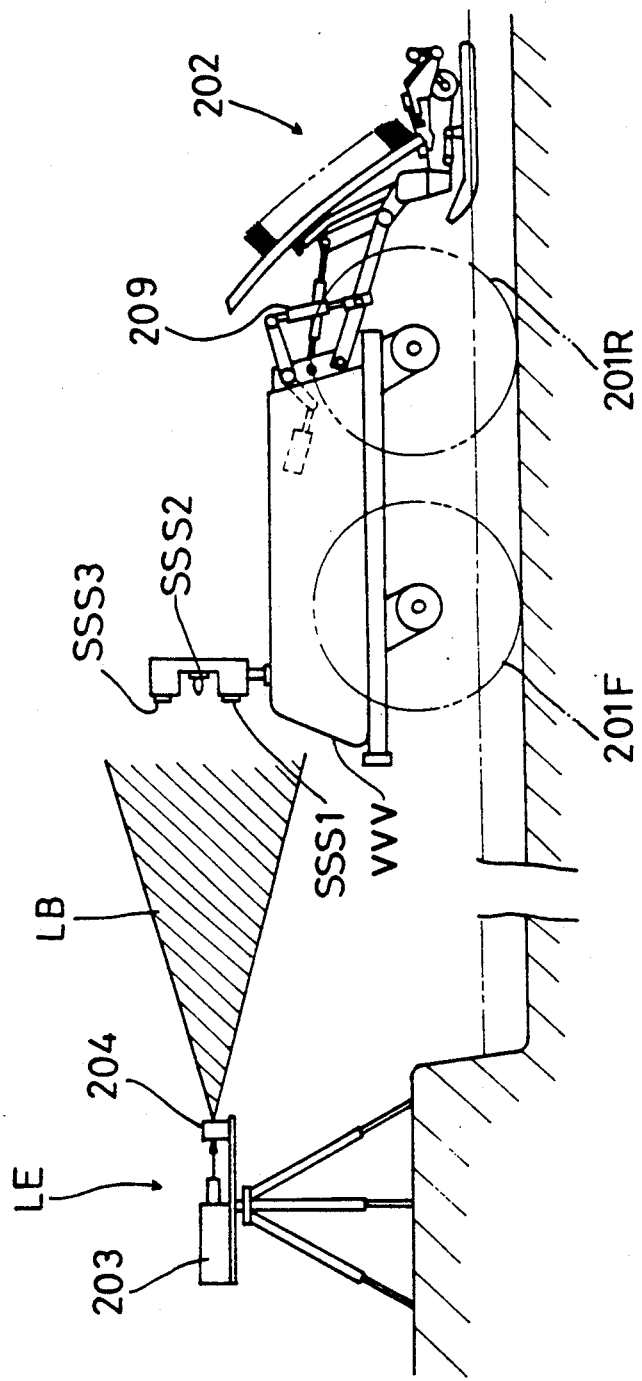

CONTROL SYSTEM FOR SELF-PROPELLED WORKING VEHICLE INCLUDING VEHICLE COURSE CORRECTION MEANS

This is a continuation of application Ser. No. 07/118,943, filed Nov. 10, 1987, which was abandoned upon the filing hereof.

BACKGROUND OF THE INVENTION

1) Field of the Invention

The present invention relates to a steering control system for a self-propelled working vehicle comprising steerable front and rear wheels, direction detecting means for detecting a directional error of the vehicle relative to a reference direction, sideways detecting means for detecting a sideways error of the vehicle relative to a reference line extending in a vehicle running direction, and steering control means for steering the front and rear wheels in response to signals received from the direction detecting means and the sideways error detecting means.

2) Description of the Prior Art

This type of steering control system is disclosed in U.S. Pat. No. 4,573,547, for example. According to the known construction, when the facing direction of the vehicle is displaced from a reference direction, the directional displacement is corrected promptly by steering the front and rear wheels in opposite directions. When the position of the vehicle is displaced sideways from a reference position, the sideways displacement is corrected by steering the front and rear wheels to the same steering angle and in the same direction, namely steering the front and rear wheels in a parallel steering mode. Further, a proposal is made in this prior patent to correct the directional displacement and the sideways displacement simultaneously. The correction is carried out by offsetting, from the steering angle of the front and rear wheels in the parallel steering mode for correcting the sideways displacement, only the front wheels by a predetermined angle in a direction to correct the directional displacement.

In the proposed method of correcting both the directional displacement and sideways displacement by offsetting only the front wheels from the steering angle in the parallel steering mode, however, the sideways displacement is corrected after the directional displacement or vice versa depending on directions in which these errors have taken place. This correcting process cannot be very smooth and may adversely affect results of the operation by the working vehicle.

SUMMARY OF THE INVENTION

The object of the present invention is to provide a steering control system for a self-propelled working vehicle capable of correcting both a directional displacement and a sideways displacement of the vehicle smoothly and quickly.

In order to achieve this object, a steering control system according to the present invention comprises direction detecting means for detecting a directional error of the vehicle relative to a reference direction, sideways error detecting means for detecting a sideways error of the vehicle relative to a reference line extending in a vehicle running direction, and steering control means for steering the front and rear wheels in response to signals received from the direction detecting means and the sideways error detecting means, the steering control means having at least a turn steering mode for steering the front and rear wheels to the same steering angle in opposite directions and a parallel steering mode for steering the front and rear wheels to the same steering angle in the same direction, wherein, when detection by the direction detecting means of the directional error of the vehicle and detection by the sideways error detecting means of the sideways error of the vehicle take place simultaneously, the steering control means determines steering directions and steering angles of the front and rear wheels in response to the signals received from the direction detecting means and the sideways error detecting means so that the directional error and the sideways error are corrected simultaneously.

In a preferred embodiment of the invention, when the detection by the direction detecting means of the directional error of the vehicle and the detection by the sideways error detecting means of the sideways error of the vehicle take place simultaneously and the directional error and the sideways error are in the same direction, the steering control means offsets the steering angle of the front wheels by a fixed amount in a direction to correct the sideways error with respect to positions of the front and rear wheels in the parallel steering mode. When the detection by the direction detecting means of the directional error of the vehicle and the detection by the sideways error detecting means of the sideways error of the vehicle take place simultaneously and the directional error and the sideways error are in opposite directions, the steering control means offsets the steering angle of the rear wheels by the fixed amount in the direction to correct the sideways error with respect to the positions of the front and rear wheels in the parallel steering mode. Thus, both the directional displacement and the sideways displacement are corrected quickly and smoothly by steering the front and rear wheels in an optimal way regarding to the directions in which the two displacements have occurred.

Other features and advantages of the present invention will be apparent from the following description.

BRIEF DESCRIPTION OF THE DRAWINGS

The drawings illustrate three embodiments incorporating a steering control system according to the present invention. FIGS. 1 through 12 relate to a vehicle for sprinkling chemicals, FIGS. 13 through 17 relate to a lawn mower, and FIGS. 18 through 20 relate to a seedling planter. More particularly:

FIG. 1 is a side elevation of a chemicals sprinkling vehicle constituting a first embodiment of the invention, FIG. 2 is an explanatory view of a running track, FIG. 3 is a plan view showing obstacle sensing areas of ultrasonic sensors and a rough construction of the sprinkling vehicle, FIG. 4 is a block diagram of a control system, FIG. 5 is a flowchart showing an operation of CPU2 at a playback time, FIG. 6 is a view showing data in target steering angle addresses, FIGS. 7A and 7B are flowcharts showing an operation of CPU1, FIG. 9 is a flowchart for judging an end of straight running, FIG. 10 is a flowchart of a turn control, FIG. 11 is a flowchart of a radio control interrupt, FIG. 12 is a flowchart of a radio control request, FIG. 16 is a flowchart of a control operation, FIG. 17 is a side elevation of a seedling planter constituting a third embodiment of the invention, for illustrating a positional relationship between optical sensors and a beam emitter.

DESCRIPTION OF THE PREFERRED EMBODIMENTS

A first embodiment of the present invention will be described, in which a steering control system is incorporated into a working vehicle for sprinkling chemicals while running through rows of fruit trees in an orchard or the like.

Figure 1:
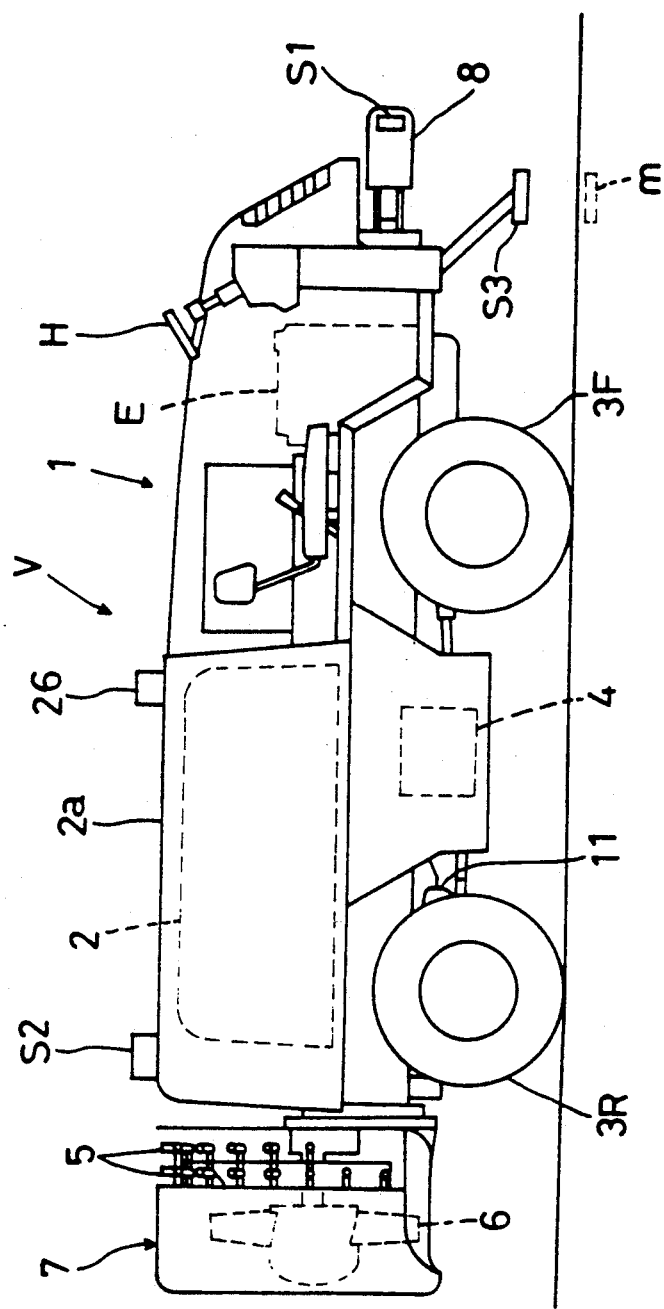
Figure 2:
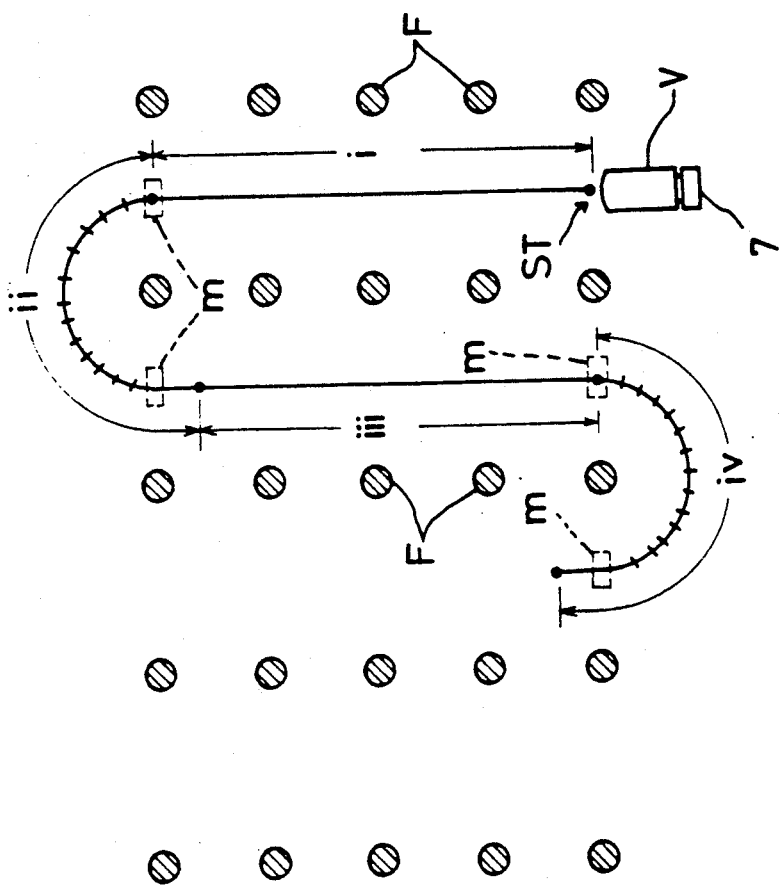

This working vehicle is operable by automatic running, by remote control or radio control, and by manual or mounted driver control. As shown in FIG. 1, the vehicle V comprises an engine E and a driver's section 1 at a front portion thereof, and a chemicals tank 2 having an outer cover 2a at a rear portion thereof. The vehicle V carries, rearwardly of the chemicals tank 2, a sprinkler 7 including a plurality of nozzles 5 for jetting out chemicals delivered from the chemicals tank 2 by a pump 4 mounted in a lower position of the vehicle, and a blower 6 for dispersing the chemicals. As shown in FIG. 2, the vehicle V sprinkles the chemicals while running in a zigzag through trees, i.e. running along a straight course and making a turn round a tree at the end of the straight course to move into a next straight course.

The vehicle V further comprises a bumper 8 acting as contact type obstacle sensor at the front thereof. The bumper 8 is rearwardly retractable by contact with an obstacle to absorb the shock. This retraction of the bumper 8 turns on a contact sensor SC comprising a limit switch (FIG. 4), whereupon the vehicle V makes an emergency stop.

Figure 3:
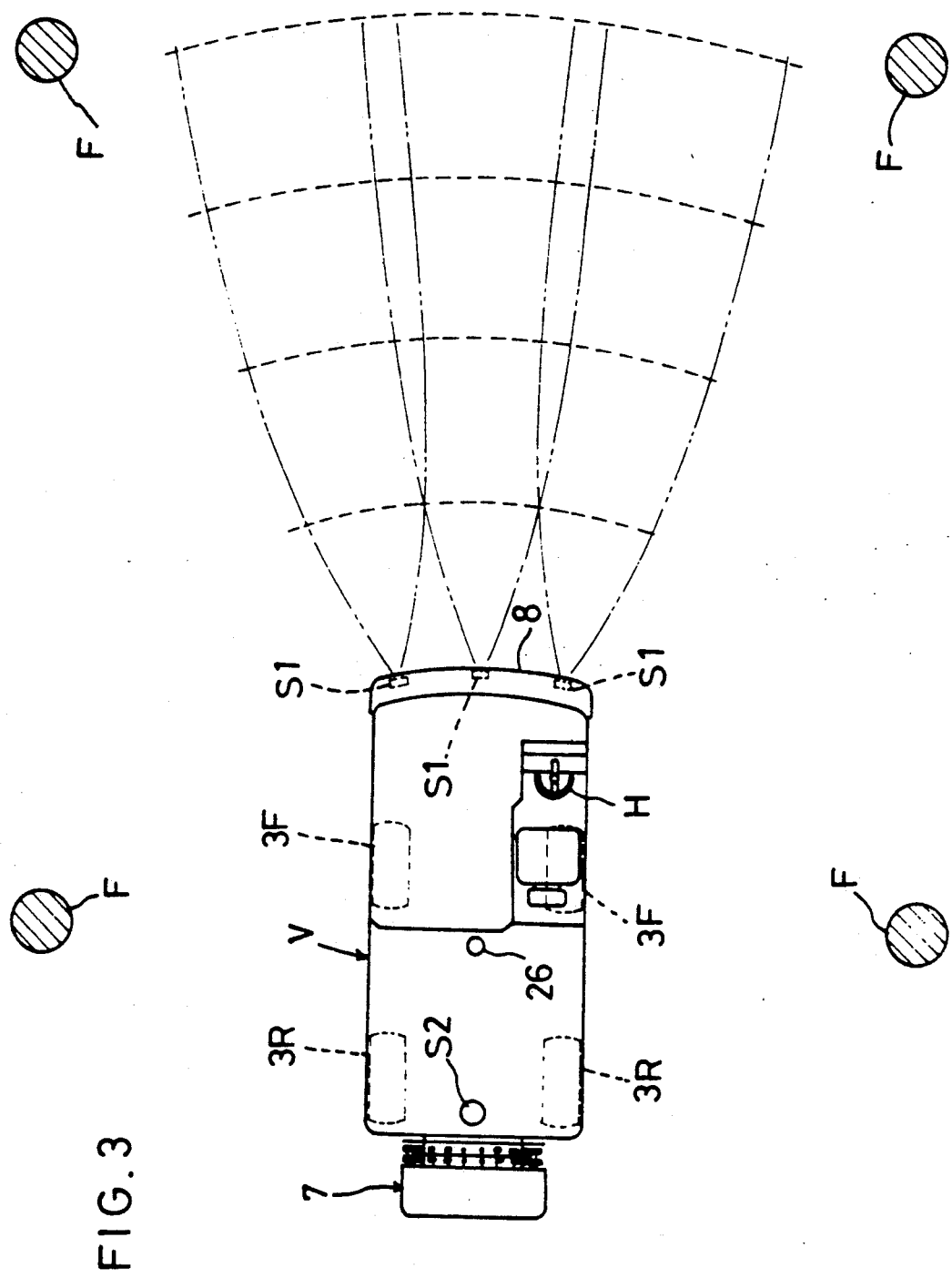

The bumper 8 includes three ultrasonic sensors S1 acting as noncontact type obstacle sensors at a front face thereof. The sensors S1 are arranged at the center and at right and left positions with respective obstacle sensing areas adjacent to one another as shown in FIG. 3. The right and left ultrasonic sensors S1 detect distances to trees F at right and left sides serving as running guides, respectively. These distances may roughly be associated with sideways displacements of the vehicle V with respect to the running guides, and are detected as distances USDAT to obstacles. The distances thus detected are used as obstacle detection data or control data for steering the vehicle along the course between the right and left rows of trees F. The right and left ultrasonic sensors S1 have obstacle sensing areas diverging outwardly of a vehicle width. The center ultrasonic sensor S1 detects an obstacle within one meter.

A direction sensor S2 is provided above the chemicals tank 2 to detect absolute direction or orientation by sensing geomagnetism. Specifically, the direction sensor S2 detects a directional error or angular displacement of the vehicle V with respect to a reference direction corresponding to a longitudinal direction of the rows of the running guides, namely the rows of trees F.

As shown in FIG. 2, a marker m formed of iron or other magnetic material is laid in the ground between trees at the end of each straight running course. Marker m is also shown in FIG. 1. The vehicle carries a magnetism sensitive proximity sensor S3 at a lower front position thereof for detecting the markers m as shown in FIG. 1.

A drive system of the vehicle V will be described next with reference to FIG. 4. The drive system comprises right and left front wheels 3F and rear wheels 3R, hydraulic cylinders 9F and 9R for steering the front and rear wheels 3F and 3R, respectively, and control valves 10F and 10R for controlling the cylinders 9F and 9R, respectively.

A hydraulic stepless transmission 11 is operatively connected to the engine E for switching engine drive between forward rotation and backward rotation and changing speeds of the forward and backward rotations. The front and rear wheels 3F and 3R are driven simultaneously by outputs of the transmission 11. The transmission 11 includes a change speed arm 14 operatively connected to a change speed pedal 12 operable by the driver and to a change speed motor 13 acting as change speed actuator for use in the remote control. Thus, the transmission 11 is controllable by both the pedal 12 and the motor 13.

The driver's section 1 includes a steering handle H for use by the driver. Reference S4 in FIG. 4 indicates a distance sensor for detecting a running distance by means of r.p.m. output of the transmission 11.

Directional and sideways displacements of the vehicle are corrected by steering the front and rear wheels 3F and 3R. For this purpose, the following steering modes are available; a parallel steering mode in which the front and rear wheels are steered in the same direction and at the same steering angle for causing a parallel movement of the vehicle V, a turn steering or four wheel steering mode in which the front and rear wheels are steered at the same steering angle in opposite directions for causing a sharp turn of the vehicle V, an offset steering mode in which either the front wheels or the rear wheels are offset by a selected value with respect to the steering angle of the front and rear wheels in the parallel steering mode, that is to say the front and rear wheels are steered in the same direction but at different steering angles, and a two wheel steering mode in which only the front wheels 3F are steered as in ordinary motor vehicles. It is of course possible to employ a mode in which the front and rear wheels are steered in opposite directions and at different steering angles, and a mode in which only the rear wheels are steered.

At least the parallel steering mode and turn steering mode are available for the remote control. The parallel steering mode, turn steering mode and two wheel steering mode are available for control by the mounted driver. At times of automatic running of the vehicle, the above steering modes are automatically switchable and the offset mode is available in addition. The offset mode may of course be made available for the remote control and the control by the mounted driver as well.

The vehicle V further includes a potentiometer RH rotatable with the steering handle H for detecting a target steering angle at times when the vehicle V is controlled by the mounted driver, and potentiometers R1 and R2 for detecting steering angles of the front and rear wheels 3F and 3R, respectively. A potentiometer R3 is provided which is operable with a pivotal movement of the change speed arm 14 for detecting a change speed position of the transmission 11. Detection signals of the potentiometers RH and R1-R3 are input to a control unit 15 constituting automatic running control means, remote control means and driver control means. The vehicle includes a switch 16 for selecting one of these control means for controlling the vehicle V, and a switch 17 for selecting one of the steering modes at times of the control by the mounted driver. As will be described in detail later, the remote control means is operable with priority over the automatic running control means at times of automatic running, without operating the control selecting switch 16.

Figure 4:
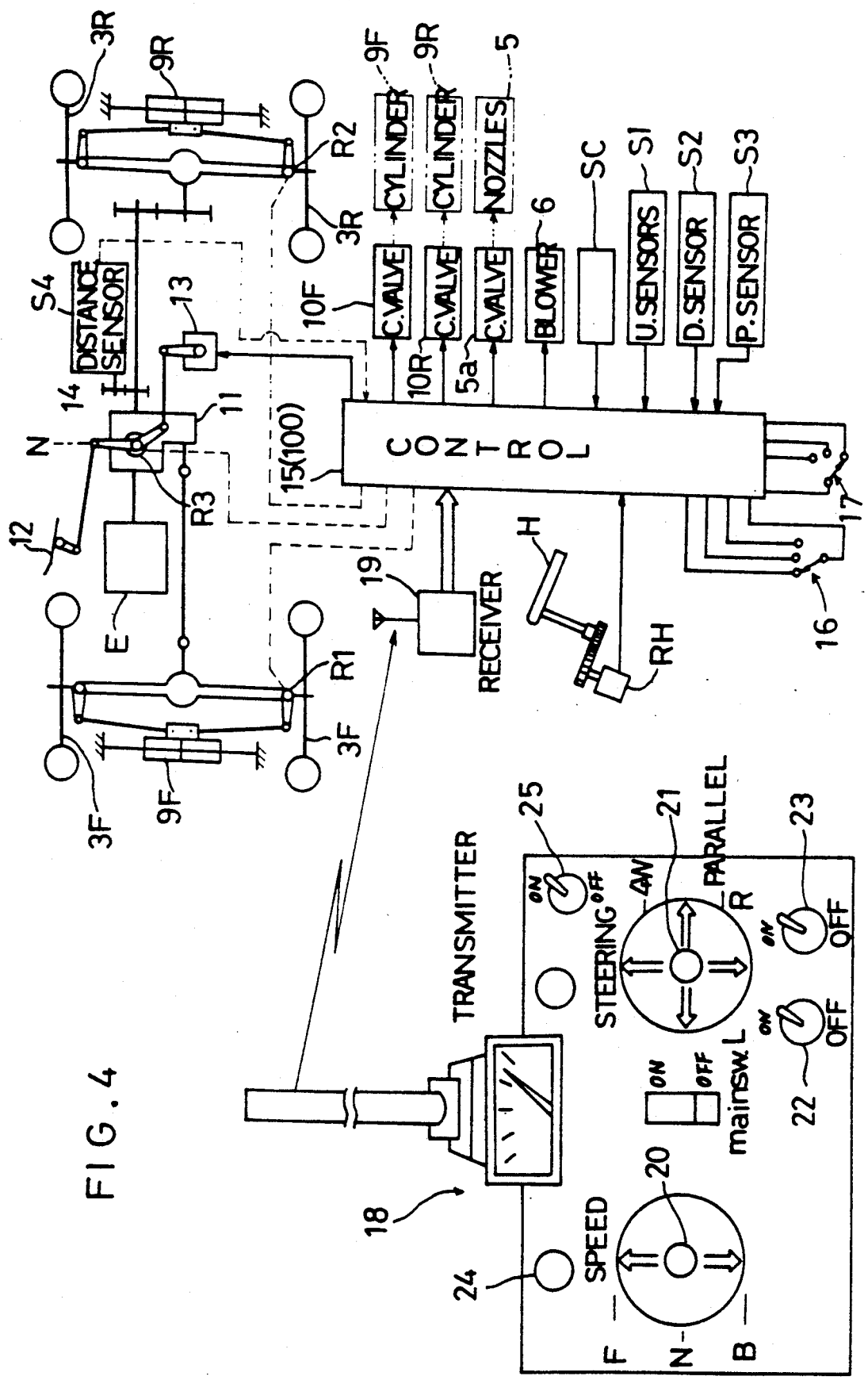

Referring to FIG. 4, the driver control means is operable in response to the steering mode selecting switch 17 and the potentiometer RH for detecting the target steering angle, to control the control valves 10F and 10R connected to the steering hydraulic cylinders 9F and 9R. Thus, the front and rear wheels 3F and 3R are steered in a selected steering mode and to the target steering angle set by the steering handle H. At times of the control by the mounted driver, the transmission 11 is set to a change speed position, that is the vehicle is set to a selected speed, by depressing the change speed pedal 12 to directly operate the change speed arm 14. For safety's sake, biasing means is provided to cause the transmission 11 to automatically return to neutral or vehicle stopping position N when the change speed pedal 12 is released.

For enabling the remote control, the vehicle V includes a radio transmitter 18 for transmitting control signals and a receiver 19 for receiving the signals. In response to the signals the remote control means controls the control valves 10F and 10R connected to the steering hydraulic cylinders 9F and 9R, the change speed motor 13, a control valve 5a connected to the nozzles 5, and the blower 6. Thus, remote control is provided for running the vehicle V and operating the chemicals sprinkler 7.

As shown in FIG. 4, the radio transmitter 18 includes a change speed lever 20 rockable back and forth for setting the transmission 11 to a target change speed position, and a steering lever 21 rockable back and forth for setting steering modes and right and left for setting target steering angles for the front and rear wheels 3F and 3R. The transmiter 18 further includes a blower switch 22 for turning on and off the blower 6 of the sprinkler 7, a nozzle switch 23 for turning on and off the nozzles 5 for jetting out the chemicals, and an emergency stop switch 24 for bringing the vehicle V to an emergency stop. Still further, an interrupt switch 25 is provided to act as control switching means for operating the remote control means with priority over the automatic running control means. When this switch 25 is operated during the automatic running of the vehicle V, the vehicle V and the sprinkler 7 become controllable by the levers 20 and 21 and switches 22, 23 and 24 of the radio transmitter 18.

The vehicle V may stop while automatically running under control by the automatic running control means, as a result of detection by the ultrasonic sensors S1 or contact sensor SC of an obstacle ahead of the vehicle or as a result of malfunctioning of these sensors, for example. On such an occasion the operator need not go to the vehicle V which is standing still but may just operate the interrupt switch 25. Then the vehicle V may be directed clear of the obstacle, if any, under remote control by the radio transmitter 18. The automatic running control is automatically reinstated once the interrupt switch 25 is turned off, to permit the vehicle V to resume the automatic running.

For safety's sake, biasing means is provided to cause the change speed lever 20 to automatically return to neutral or vehicle stopping position N when the lever 20 is released.

Details of the automatic running control means will be described next with reference to the operation of control unit 15.

Though not shown in the drawings, the control unit 15 comprises two processors. One of the processors (hereinafter referred to as CPU1) processes detection data received from the ultrasonic sensors S1 and direction sensor S2. The other processor (hereinafter referred to as CPU2) controls various actuators on the basis of the detection data processed by CPU1, detection data received from the other sensors, data received from the receiver 19, and prestored running control data.

An outline of vehicle running under automatic running control will be described first. As shown in FIG. 2, the running track of the vehicle is divided into four courses i to iv. The first course i is a straight course extending from a starting point ST to a position between the trees F at the end opposite the starting point ST. The second course ii is a curved course describing a half circle from the abovementioned position at the end around one of the trees F at the end. The third course iii is a straight course continuous from the second course ii and extending parallel to the first course i. The fourth course iv is a curved course like the second course ii, describing a half circle from the end of the third course iii to a further straight course extending in the same direction as the first course i. The control unit 15 is taught the four courses i-iv while the vehicle is driven under control by the driver control means or remote control means. The teaching is based on the detection data for the respective courses provided by the direction sensor S2, distance sensor S4 and steering angle detecting potentiometers R1 and R2, with the trees F serving as the running guides. In this embodiment, for each of the first and third, straight courses i and iii, only an actual running distance $DLENG(n), n=1,3$ from the starting point to a point where the proximity sensor S3 operates and a reference or basic direction BASDR $BASDR(n), n=1,3$ obtained by averaging detected directions are stored as running control data with respect to the running guides. For each of the second and fourth, turning courses ii and iv, the steering angles detected by the potentiometers R1 and R2 are sampled at predetermined intervals (about 20cm in this embodiment), and stored as running control data with respect to the running guides.

After completing the above teaching process, the vehicle V is moved back to the starting point ST of the working track. The vehicle V is thereafter run under control based on the data for the first to fourth courses i-iv stored during the teaching process. The vehicle V moves backward and forward through the trees F, running each course repeatedly a predetermined number of times and automatically making a turn at the end of each straight course. While running, the vehicle V automatically carries out a chemicals sprinkling operation for a selected area of the orchard. Thus, the vehicle V comprises running control means for controlling the vehicle V to run according to the running control data stored during the above teaching process, and steering control means 100 for controlling the vehicle to automatically run along the running guides. This control operation is hereinafter referred to as playback process.

Figure 5:
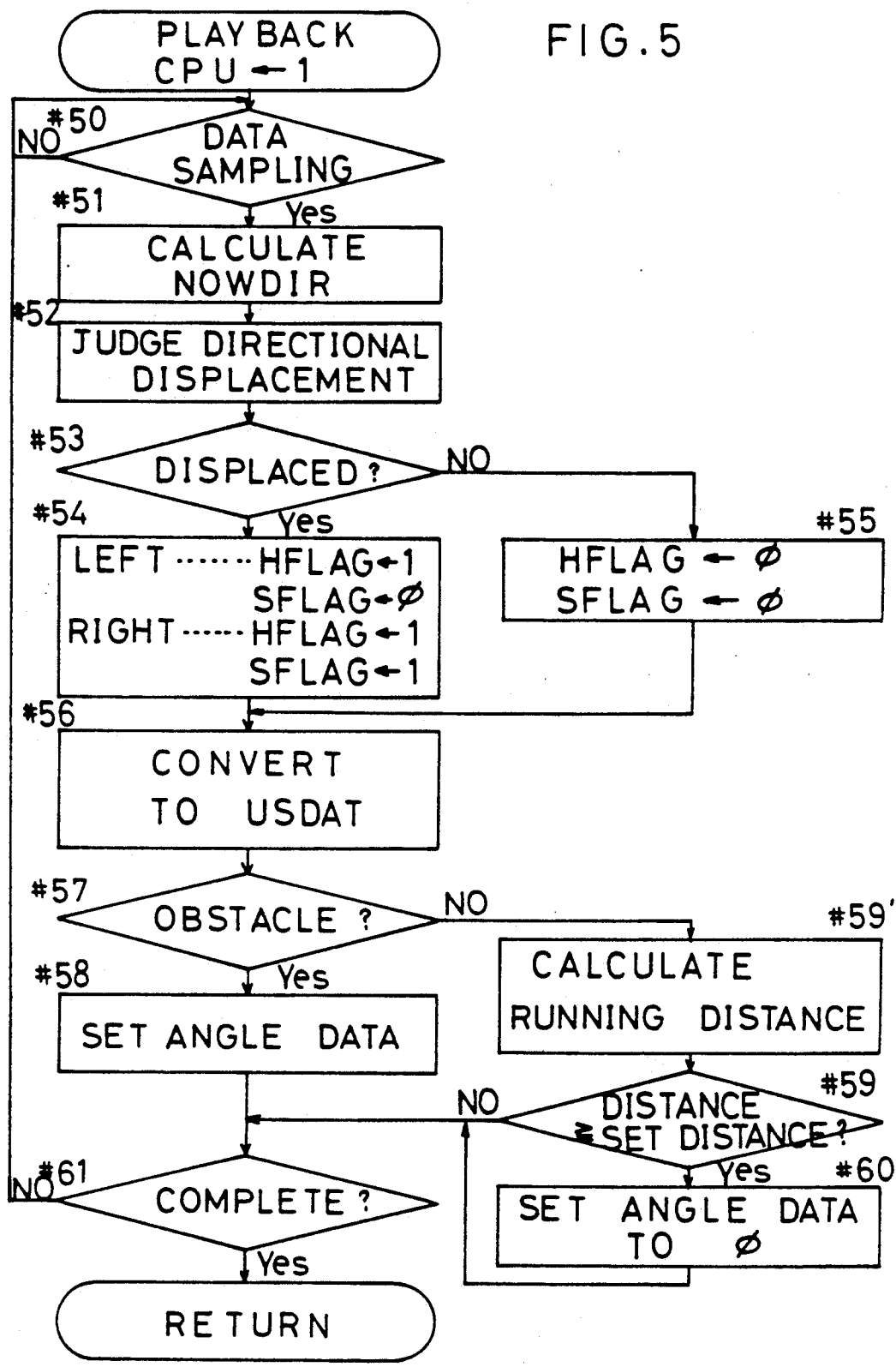

The playback process will be described in detail next. As shown in FIG. 5, when the playback process is started, CPU1 samples the detection data from the three ultrasonic sensors S1 and direction sensor S2 at predetermined intervals of time (about every 0.1 second in this embodiment) and renews a present direction NOWDIR or a current facing direction of the vehicle V (Steps #50 and #51). The present direction NOWDIR is compared with a criterion direction BASDIR provided according to the reference direction BASDR(n) stored during the teaching process, for judging whether there is any directional displacement or whether a vehicle turn is completed. If the difference is outside a predetermined non-sensitivity range, it is judged a directional displacement with respect to the running guides, and a direction flag HFLAG relating to the directional displacement is set (Step #52).

Then, at Step #53, judgment is made on the basis of whether the directional flag HFLAG is set or not, to determine presence or absence of a directional displacement. A direction flag SFLAG indicating a direction of displacement is set so as to correspond to the direction of displacement (Steps #54 and #55).

Next, at Step #56 the detection data from the three ultrasonic sensors S1 are converted according to divisional distances DIVL to be described later, into distance data USDAT corresponding to distances to an obstacle. Step #57 judges from the distance data USDAT of the right and left ultrasonic sensors S1 whether there is an obstacle ahead of the vehicle. If there is an obstacle, Step #58 sets values of steering angle addresses for setting a target steering angle corresponding to the distance data USDAT to be described in detail later. If there is no obstacle, judgment is made after the distance data USDAT change from presence to absence of an obstacle, whether the vehicle has run a predetermined distance (Steps #59' and #59). If the vehicle has run the predetermined distance, the offset values of the steering angle addresses are set to zero at Step #60. Then, the program ends after judging at Step #61 that the playback process has been completed.

If the playback process is judged at Step #61 not to have been completed, then the Steps #50 to #60 are repeated.

Figure 6:
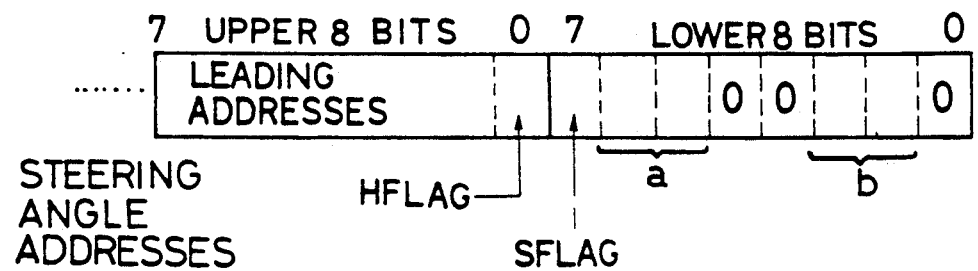

As shown in FIG. 6, a 16-bit code is used to designate addresses of the target steering angle data in this embodiment. The lowermost bit (bit "0") of the upper eight bits is used as the direction flag HFLAG, and the uppermost bit (bit "7") of the lower eight bits is used as the direction flag SFLAG for indicating a direction of displacement. The remaining seven bits of the upper eight bits are set to values corresponding to leading addresses of a memory (not shown) storing the target steering angle data. Two bits, bits "5" and "6", of the lower eight bits indicate an offset value, a, with respect to the leading addresses of the target steering angle corresponding to the distance data USDAT provided by the left ultrasonic sensor S1. Bits "1" and "2" of the lower eight bits indicate an offset value b with respect to the leading addresses of the target steering angle corresponding to the distance data USDAT provided by the righthand ultrasonic sensor S1. Thus, the target steering angle is determined immediately from the values of direction flag HFLAG, direction flag SFLAG and distance data USDAT provided by the right and left ultrasonic sensors S1.

At Step #58, the offset values, a and b, of the target steering angle are determined from the distance data USDAT provided by the right and left ultrasonic sensors S1. For this purpose, the offset values, a and b are set for the distance data USDAT as shown in the following table:

TABLE 1

| USDAT | a, b |
| --- | --- |
| 4m | 01 |
| 3m | 10 |
| 2m | 11 |

In this embodiment, the values of distance data USDAT are set for 1m, 2m, 3m and 4m (FIG. 3) according to the divisional distances DIVL described later.

When the distance data USDAT indicates a distance within 1m, the vehicle V is brought to an emergency stop to avoid a collision. Then the steering control itself becomes insignificant, and therefore the target steering angle is not set in this case.

When the distance data USDAT indicates a distance exceeding 4m, the steering control is unnecessary. Thus, the value of distance data USDAT is set to zero for expediency of data processing, and the target steering angle is not set. When the distance data USDAT provided by either of the right and left ultrasonic sensors S1 indicates a distance within 4m, addresses for the target steering angle are set in accordance with Table 1.

Figure 7A:
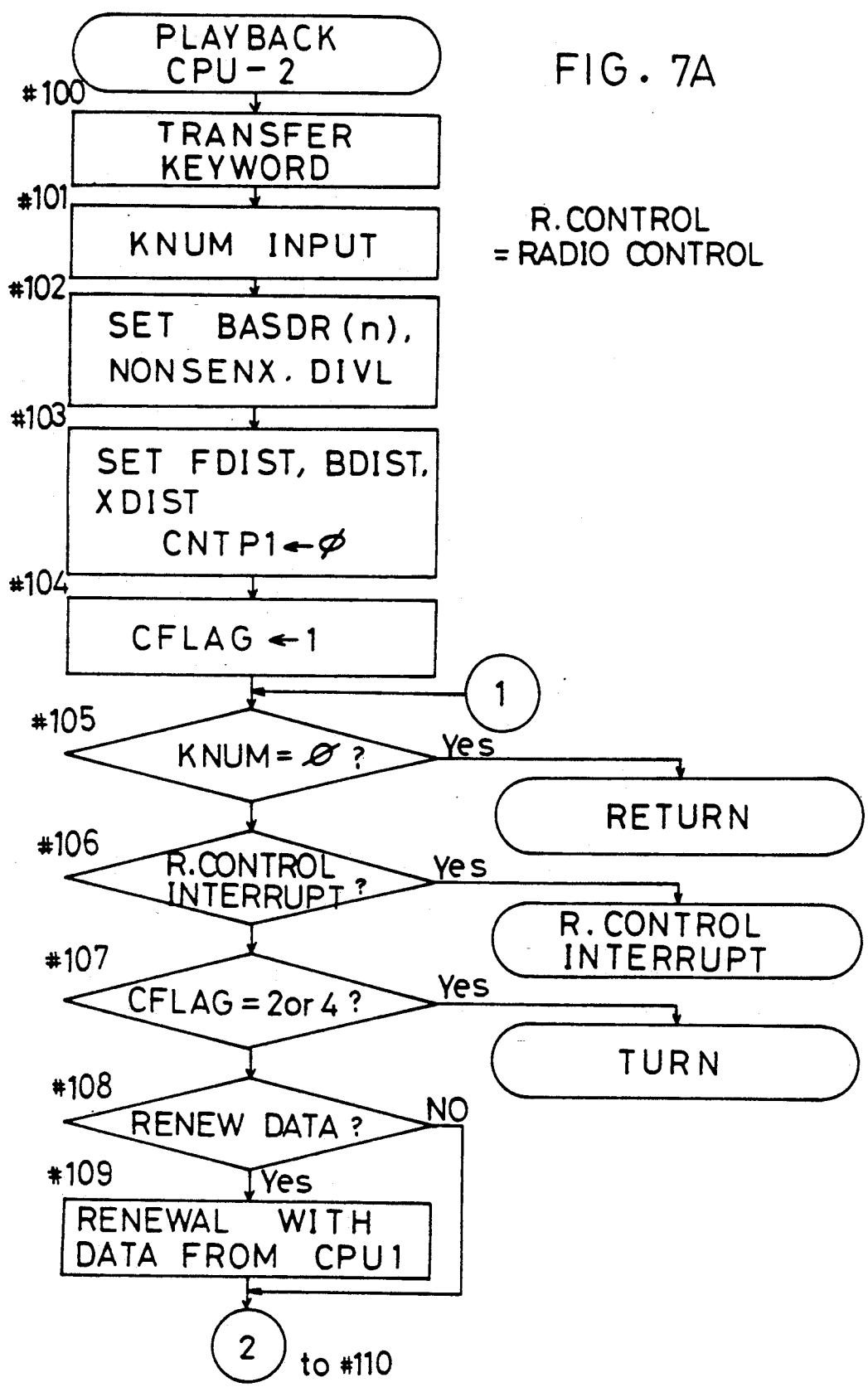

The operation of CPU2 will be described next with reference to FIGS. 7A and 7B. When the playback process is started, CPU2 transfers a starting keyword of the playback and inputs the number of straight courses KNUM to CPU1 at Steps #100 and #101.

At Step #102, CPU2 sets the reference direction BASDR(n) stored during the teaching process, a non-sensitivity range NONSENX for carrying out the steering control when a deviation from the reference direction BASDR(n) exceeds a predetermined permissible value, and the predetermined divisional distances DIVL of 1m, 2m, 3m and 4m for the sensing distance range of the ultrasonic sensors S1. At Step #103, CPU2 calculates scheduled running distances of the straight courses as a forward area FDIST by subtracting a predetermined distance from the reference distance DLENG(n) and as a backward area BDIST by adding the predetermined distance to the reference distance DLENG(n), and a deceleration distance XDIST corresponding to a deceleration starting point for decelerating the vehicle to make a turn reliably. The value CNTP1 of a distance counter for measuring an actual running distance is also set to zero and all the running control data are initialized. At Step #104 the course flag CFLAG for indicating which of the first to fourth courses the vehicle is running is set to "1" signifying the first course i.

When the course flag CFLAG has been set at Step #104, the vehicle starts running and its speed is made to equal a set running speed by controlling the transmission 11 to an appropriate change speed position by means of detection values of the change speed position detecting potentiometer R3. Step #105 judges whether the vehicle has run all of the courses or not by checking the number of courses KNUM input at Step #101.

If the vehicle has run all of the courses, the playback process is terminated to return to an operational mode selecting sequence and complete the entire process.

Next, step #106 checks from the data received by the radio receiver 19 whether the interrupt switch 25 is turned on or not. Judgment is made through this checking as to whether a radio control interrupt has taken place to switch for the remote control during the automatic running. Step #107 judges whether the value of course flag CFLAG set at a straight course ending step for judging the ends of the straight courses to be described later, is "2" or "4" signifying the second or fourth, turning course ii or iv.

If the radio control interrupt has taken place, the program branches to a radio control interrupt routine to be described later. If the course flag CFLAG is set to "2" or "4", the program branches to a turning routine to be described later. In either case, Step #108 and subsequent steps are left pending.

On the other hand, if all of the courses are not completed without the radio control interrupt and without the course flag CFLAG being set for the turning courses, CPU2 waits for the detection data of direction sensor S2 and ultrasonic sensors S1 to be transferred from CPU1 and renews these data (Steps #108 and #109).

Next, Step #110 checks whether the direction flag HFLAG is set or not, to judge whether there is a directional displacement of the vehicle with respect to the reference direction BASDR(n).

If there is a directional displacement, judgment is made at Step #111 whether the displacement has been newly developed from a no displacement state or is continuing from a directional displacement detected at a previous data renewal time.

If the displacement is continuing from the previous time, Step #112 judges whether or not a steering position is set for correcting the directional displacement of the vehicle V in order to bring the present direction NOWDIR into the predetermined nonsensitivity range NONSENX with respect to the basic direction BASDIR.

If the steering position is set for correcting the directional displacement, Step #113 sets the bit position (bit "0" of the upper eight bits) of the steering angle address or the value of direction flag HFLAG indicating presence and absence of a directional displacement, and the bit position (bit "7" of the lower eight bits) or the value of direction flag SFLAG indicating a direction of the displacement, to zero or original values corresponding to straight running. Step #114 sets the target steering angle to a steering angle corresponding to the above address. Thereafter, at Step #115, a control signal is output in response to the steering angle for operating the control valves 10F and 10R connected to the steering hydraulic cylinders 9F and 9R, respectively.

Next, Step #116 checks whether the proximity sensor S3 is turned on or not, to judge whether the vehicle has arrived at the end of the straight course or the starting point of the turning course. Step #117 checks whether any one of the three ultrasonic sensors S1 detects an obstacle within 1m ahead of the vehicle V. If the proximity sensor S3 is turned on, the program branches to the straight course ending routine. If any one of the ultrasonic sensors S1 detects an obstacle within 1m ahead, the vehicle is brought to an emergency stop and the program branches to a radio control request routine to be described later, to invite a radio control interrupt for steering the vehicle clear of the obstacle by remote control.

Then, judgment is made whether the vehicle has arrived at the deceleration point or not by comparing the deceleration distance XDIST and the count of distance counter CNTP1 which measures the running distance on the basis of detections by the distance sensor S4. If the count has reached the deceleration distance XDIST, the vehicle is decelerated to a predetermined speed (Steps #118 and #119). If not, the program returns to Step #105 without decelerating the vehicle.

A process of reading out the target steering angle in accordance with the steering angle address set at Step #114 and its value will be described in detail. When the value of direction flag HFLAG indicates no directional displacement, the target steering angle is set for each of the front and rear wheels 3F and 3R in accordance with Table 2 set out hereinafter. When the value of direction flag SFLAG indicates a directional displacement, the target steering angle is set in accordance with Tables 3 and 4 also set out hereinafter.

Each of these tables is divided into frames arranged in the horizontal direction by the 1m detecting zone, 2m detecting zone, 3m detecting zone and 4m detecting zone of the righthand ultrasonic sensor. Similarly, each table is divided into frames arranged in the vertical direction by the four detecting zones of the lefthand ultrasonic sensor. The detecting zone referenced "0" signifies that the ultrasonic sensors detect nothing. The tables show steering angles to which the front and rear wheels should be turned when, for example, the righthand ultrasonic sensor detects something in the 2m detecting zone and the lefthand ultrasonic sensor in the 4m detecting zone.

Further, in these tables, the letter N represents a neutral state where the steering angle is zero. The upper line in each frame shows a target steering angle for the front wheels 3F, and the lower line shows a target steering angle for the rear wheels 3R.

TABLE 2

| | No Directional Displacement (HFLAG = 0) | | | | |
|---|---|---|---|---|---|
| | | | right | | |
| left | 4m | 3m | 2m | 1m | 0 (∞) |
| 4m | N | N | N | — | r. 10 |
| | N | N | N | — | r. 10 |
| 3m | N | N | N | — | r. 20 |
| | N | N | N | — | r. 20 |
| 2m | N | N | N | — | r. 25 |
| | N | N | N | — | r. 25 |
| 1m | — | — | — | — | — |
| 0 (∞) | l. 10 | l. 20 | l. 25 | — | N |
| | l. 10 | l. 20 | l. 25 | — | N | r. = right
l. = left

TABLE 3

| | Leftward Directional Displacement (HFLAG = 1, SLFAG = 1) | | | | |
|---|---|---|---|---|---|
| | | | right | | |
| left | 4m | 3m | 2m | 1m | 0 (∞) |
| 4m | r. 10 | r. 10 | r. 10 | — | r. 10 |
| | N | N | N | | N |
| 3m | r. 10 | r. 10 | r. 10 | — | r. 20 |

TABLE 3-continued

Leftward Directional Displacement
(HFLAG = 1, SLFAG = 1)

| left | 4m | 3m | 2m | 1m | right 0(∞) |
|---|---|---|---|---|---|
| 2m | N | N | N | — | r. 10 |
|  | r. 10 | r. 10 | r. 10 | — | r. 25 |
|  | N | N | N | — | r. 15 |
| 1m | — | — | — | — | — |
| 0(∞) | N | l. 10 | l. 15 | — | r. 10 |
|  | l. 10 | l. 20 | l. 25 | — | N |

TABLE 4

Rightward Directional Displacement
(HFLAG = 1, SFLAG = 0)

| left | 4m | 3m | 2m | 1m | right 0(∞) |
|---|---|---|---|---|---|
| 4m | l. 10 | l. 10 | l. 10 | — | N |
|  | N | N | N | — | r. 10 |
| 3m | l. 10 | l. 10 | l. 10 | — | r. 10 |
|  | N | N | N | — | r. 20 |
| 2m | l. 10 | l. 10 | l. 10 | — | r. 15 |
|  | N | N | N | — | r. 25 |
| 1m | — | — | — | — | — |
| 0(∞) | l. 10 | l. 20 | l. 25 | — | l. 10 |
|  | N | l. 10 | l. 15 | — | N |

If there is no directional displacement, the vehicle position is only transversely corrected in the parallel steering mode in accordance with Table 2. This brings the vehicle to a mid-position between the right and left trees serving as the running guides.

Figures 8A, 8B:
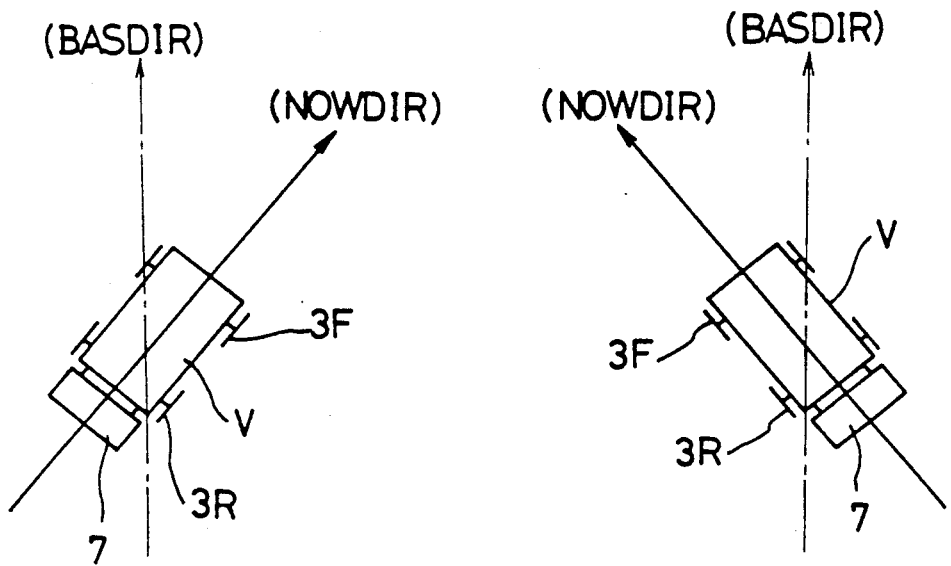
FIGS. 8A and 8B are explanatory views of displacements in orientation.

If there is a directional displacement, Table 3 or 4 is selected according to the value of direction flag SFLAG. That is, Table 3 is selected where the direction flag SFLAG is "0" and the facing direction of the vehicle is displaced leftward (FIG. 8A). Table 4 is selected where the direction flag SFLAG is "1" and the facing direction of the vehicle is displaced rightward (FIG. 8B). Then the front and rear wheels are steered in the steering mode which corrects both the directional displacement and sideways displacement at the same time. This brings the vehicle to the midposition between the right and left trees and the present facing direction NOWDIR within the predetermined nonsensitivity range NONSENX with respect to the reference direction BASDIR.

The target steering angles in the above tables are set to correspond to the distance data USDAT provided by the right and left ultrasonic sensors. Consequently, the smaller the distance is between the vehicle and the obstacle or the trees F serving as the running guides, the greater is the steering angle to correct the direction and position of the vehicle quickly.

According to Tables 3 and 4, the directional displacement and sideways displacement of the vehicle are corrected at the same time by steering the vehicle in the two wheel steering mode or the offset steering mode. The two wheel steering mode steers the vehicle by turning only the front wheels 3F. The offset steering mode steers the vehicle by turning the front and rear wheels 3F and 3R in the same direction but by different amounts. The former is selected where the distance to the obstacle detected by the ultrasonic sensors is long and provides a large space for correcting the directional displacement and sideways displacement. Then the two kinds of displacement may be corrected slowly. The latter is selected where the distance to the obstacle is short and provides only a small space for the correcting operation. Then the two kinds of displacement may be corrected quickly.

Figure 9:
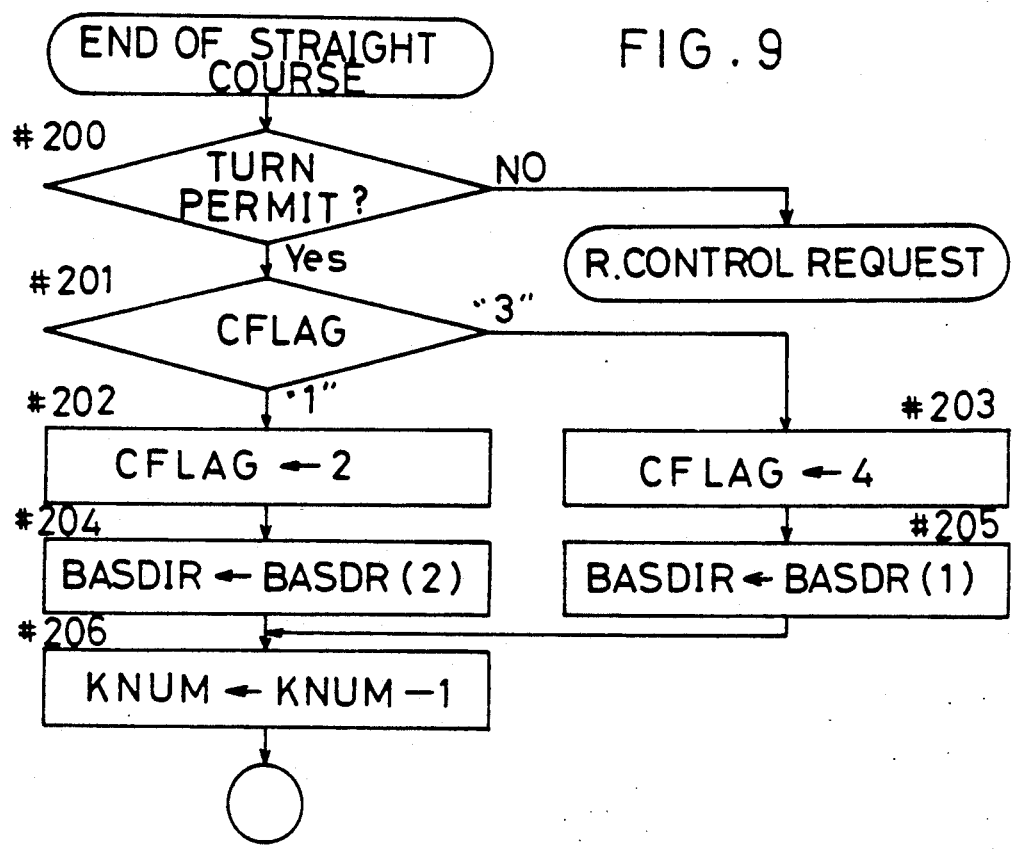

The straight course ending routine to which the program moves from Step #116 when the proximity sensor S3 is turned on, will be described with reference to FIG. 9. Step #200 judges whether the vehicle V is in a turn permitting range by checking whether the count of the distance counter CNTP1 is between the forward area FDIST and the backward area BDIST. If the vehicle is not in the turn permitting range, the program branches to the radio control request routine to turn the vehicle by remote control by means of the radio transmitter 18.

If the vehicle is in the turn permitting range, the value of course flag CFLAG is set to "2" corresponding to the second course ii or "4" corresponding to the fourth course iv depending on the current value of course flag CFLAG (Steps #201 and #202 or #203). Then, a turning direction BASDR(2) or BASDR(1) is set for judging completion of the turn (Steps #204 or #205). After decrementing the number of courses KNUM at Step #206, the program returns to the steering control operation at Steps #105 et seq.

In the above routine, the value of course flag CFLAG changes from "1" or "3" signifying the straight course to "2" or "4" signifying the turning course. Consequently, the program automatically branches to the turning routine from Step #107 where a turn or no turn is judged.

Figure 10:
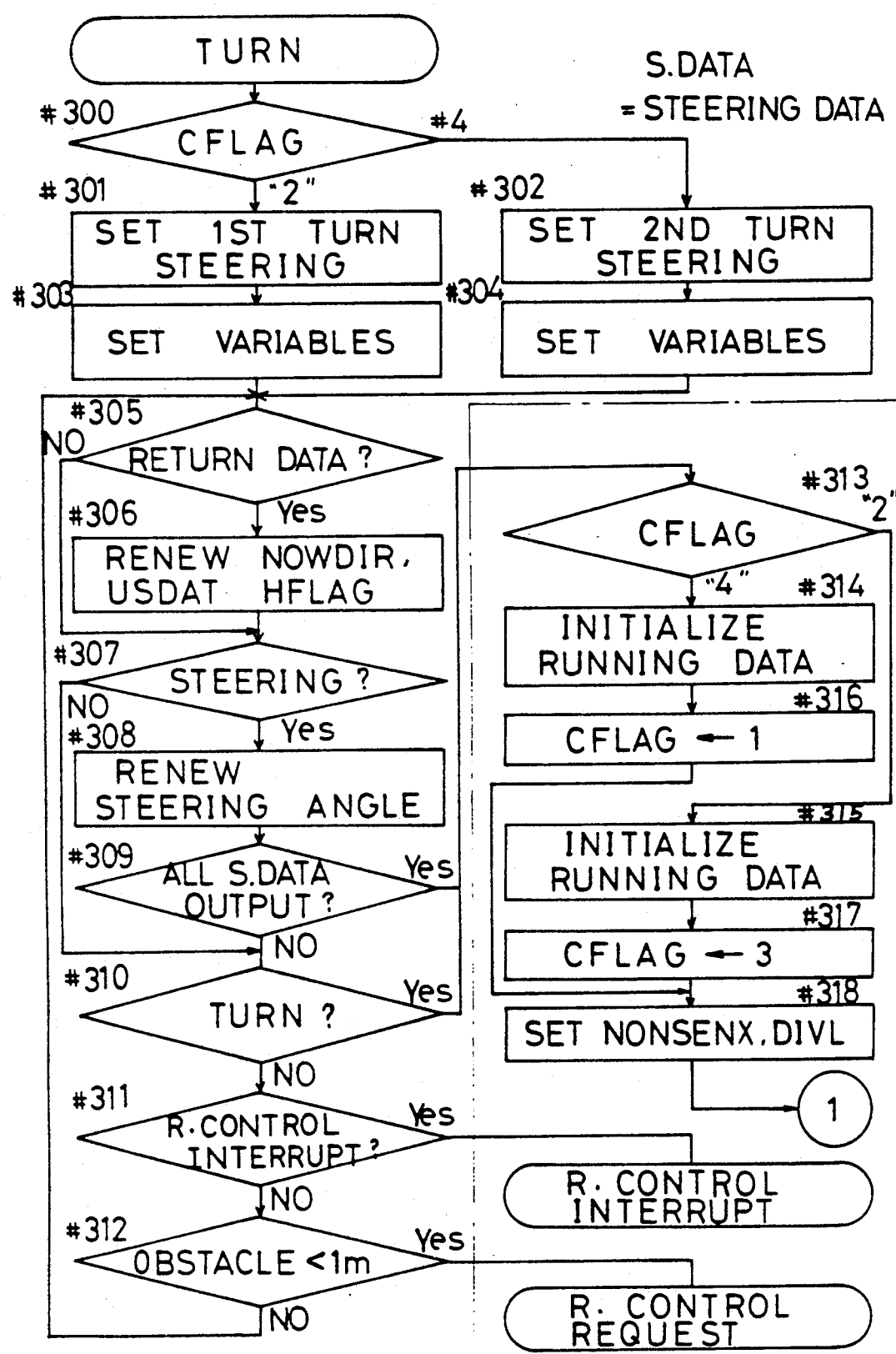

The turning routine will now be described in detail with reference to FIG. 10. Steering angle data for the second course ii or the fourth course iv stored during the teaching process is read out depending on the value of course flag CFLAG set by the above straight course ending routine (Steps #300 and #301 or #302). Then, the turning direction BASDR(2) or BASDR(1) for judging completion of the turn, the nonsensitivity range NONSENX of the direction, the divisional distances DIVL of ultrasonic sensors S1 are set again (Steps #303 or #304).

Step #305 confirms renewal by CPU1 of the detection data of direction sensor S2 and ultrasonic sensors S1. At Step #306, CPU2 receives the renewed data, namely the present direction NOWDIR, the distance detection data USDAT of the ultrasonic sensors S1, and the direction flag HFLAG.

Thereafter, Step #307 confirms sampling of the values of steering position detecting potentiometers R1 and R2. Then step #308 renews the teaching data of steering control which is the target steering angle.

Next, Step #309 judges whether all the steering data have been output or not. Step #310 judges whether the vehicle V has turned to a next course or not, by checking whether the direction flag HFLAG is set or not. If all the steering data have been output or the direction flag HFLAG is set, the program branches to Steps #313 to #318 for initializing various data for the next straight course. If all the steering data have not been output and the direction flag HFLAG is not set, Step #311 judges whether a radio control interrupt has taken place in the straight course, and Step #312 judges whether the ultrasonic sensors S1 have detected an obstacle within 1m. The program then returns to Step #305 for repeating playback of the steering data.

The above initializing process will be described. As in Steps #102 to #104 of the playback process, a forward area FDIST, a backward area BDIST and a deceleration distance XDIST are set on the basis of the value of course flag CFLAG and the scheduled running distance DLENG1 and DLENG2 (Steps #313 and #314 or #315). The value CNTP1 of the distance counter is also reset to zero. At Step #316 or #317, the course flag CFLAG is set to "1" or "3" depending on the direction in which the next straight course extends. Then the basic direction BASDR(n), the nonsensitivity range NONSENX with respect to the basic direction BASDR(n), and the divisional distances DIVL of the ultrasonic sensors S1 are set at Step #318. Thereafter, the program returns to Step #105 for judging whether all the courses have been completed or not.

Figure 11:
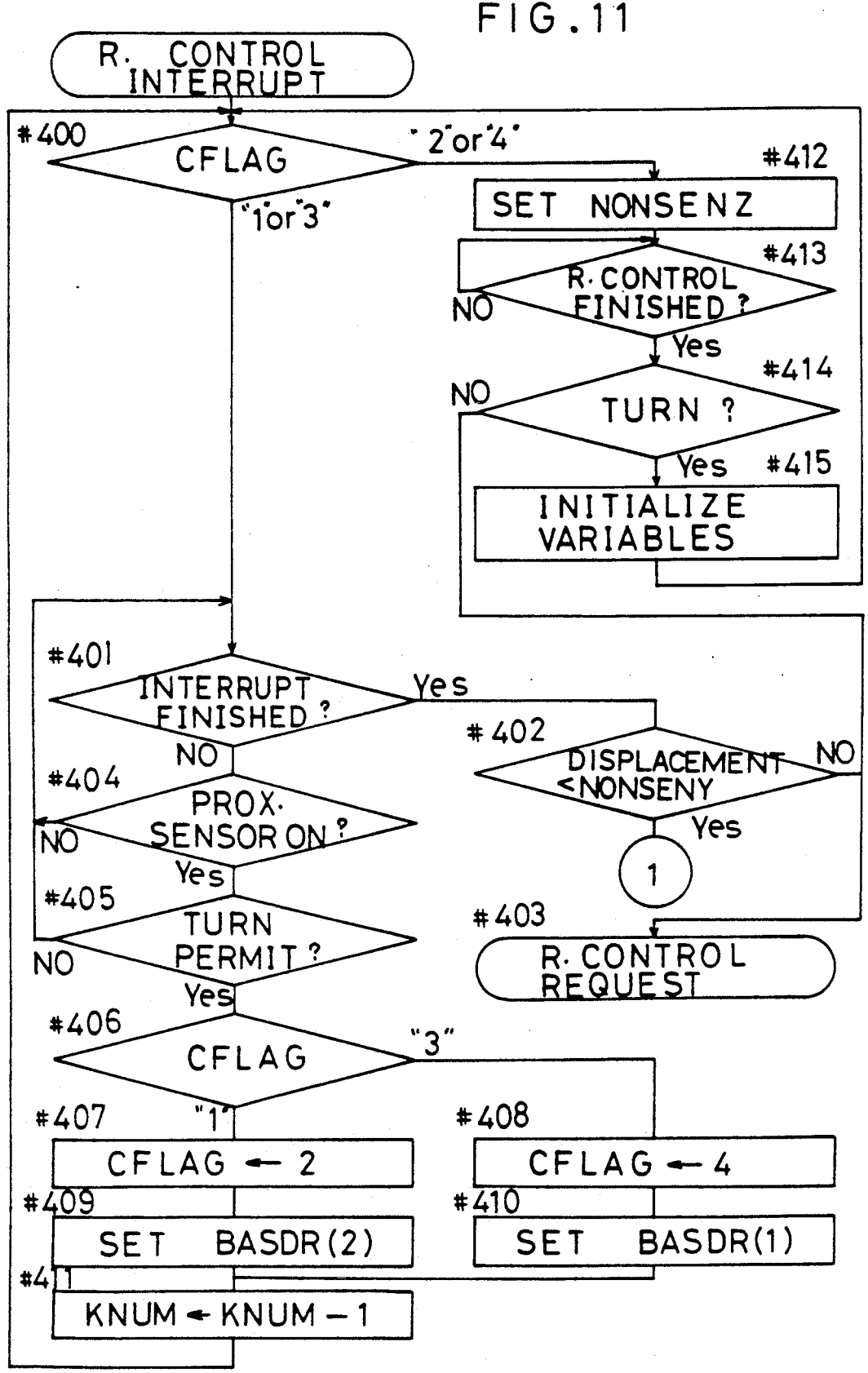

The radio control interrupt routine will be described in detail with reference to FIG. 11. First, Step #400 judges from the value of course flage CFLAG whether the vehicle is currently on a straight course or a turning course.

If the vehicle is on a straight course, Step #401 judges whether or not the radio control interrupt is completed from the position of the interrupt switch 25 input through the radio receiver 19. If the routine is completed, Step #402 judges whether the present direction NOWDIR is within a predetermined nonsensitivity range NONSENY (about ±20 degrees in this embodiment) with respect to the basic direction BASDR(n) of the present running course. If the present direction NOWDIR is within the nonsensitivity range NONSENY, the program returns to Step #105 of the playback process to keep the vehicle running automatically. If not, the program branches to Step #403 for the radio control interrupt request to be described later, for the operator to resume the remote control by means of the radio transmitter 18.

If Step #401 judges that the interrupt has not been completed, Step #404 judges whether the proximity sensor S3 is turned on or not, that is whether the straight course is completed or not. If the proximity sensor S3 is not turned on, Step #401 is repeated for judging whether the interrupt is completed or not. If the proximity sensor S3 is turned on, Step #405 judges whether the count CNTP1 of the distance counter has reached the turn permitting distance (FDIST≦CNTP1≦BDIST) as in the playback process.

If the count CNTP1 of the distance counter has reached the turn permitting distance, Step #406 judges from the value of course flag CFLAG whether the next turning course is the second course ii or the fourth course iv. Then, the course flag CFLAG is set to the value corresponding to one of the turning courses at Step #407 or #408, the turning direction BASDR(1) or BASDR(2) is set at Step #409 or #410, and the number of courses KNUM is decremented at Step #411. The program thereafter repeats Step #401 for judging whether the present course is a straight course or a turning course.

If, on the other hand, the present course is a turning course, Step #412 sets a nonsensitivity range NONSENZ for the basic direction BASDR(n) in the turning course. Then, at Step #413, the program waits till completion of the radio control interrupt as at Step #401.

When the radio control interrupt is completed, Step #414 judges whether the vehicle V has turned to the next course, by checking whether the present direction NOWDIR is within the nonsensitivity range NONSENZ of the basic direction BASDR(n). If the vehicle has turned to the next course, Step #415 carries out an initializing process for setting the reference data for the straight course as shown at Steps #312 to #317. Thereafter, the program returns to Step #401 for judging whether the present course is a straight course or a turning course. When the present direction NOWDIR is not turned even though the radio control interrupt has completed, the program branches to Step #403 for the radio control request to cause the vehicle to run by remote control to the end of the turning course.

Figure 12:
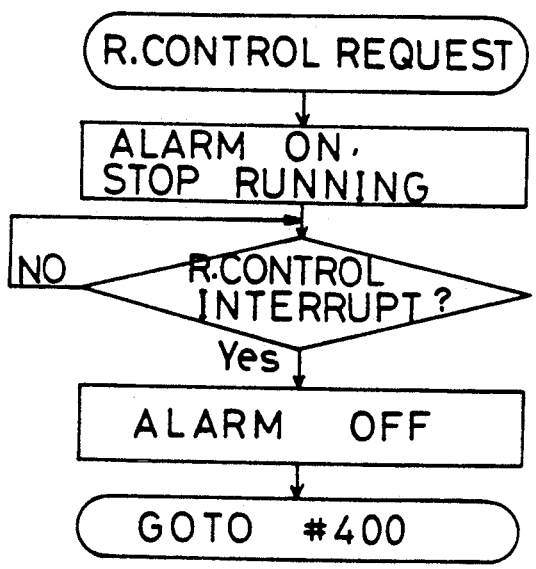

The radio control request routine will be described with reference to FIG. 12. The vehicle V is brought to an emergency stop, and an alarm light 26 mounted on top of the vehicle V (FIGS. 1 and 3) is lit to prompt the operator to start the remote control for steering the vehicle. Then the program waits for a radio control interrupt as in the radio control interrupt process. Upon radio control interrupt, the alarm light 26 is switched off and the program branches to Step #400 of the radio control interrupt routine.

Thus, when the vehicle V stops halfway along a straight course or a turning course during an automatic run as a result of malfunctioning or detection of an obstacle, the operator is able to restart the vehicle V under remote control by turning on the interrupt switch 25 of the radio transmitter 18. The vehicle may automatically return to the automatic running once certain requirements as described hereinbefore are met. The described radio control interrupt may of course take place even when the vehicle is making a proper automatic run, by turning on the interrupt switch 25 of the radio transmitter 18.

The working vehicle has been described as an example suited for running along straight courses in a zigzag by turning 180 degrees. It is equally possible to cause the vehicle to sequentially run along straight courses intersecting at 90 degrees.

Another embodiment of the invention will be described next. In this embodiment, the steering control system is incorporated into a lawn mower.

Figure 13:
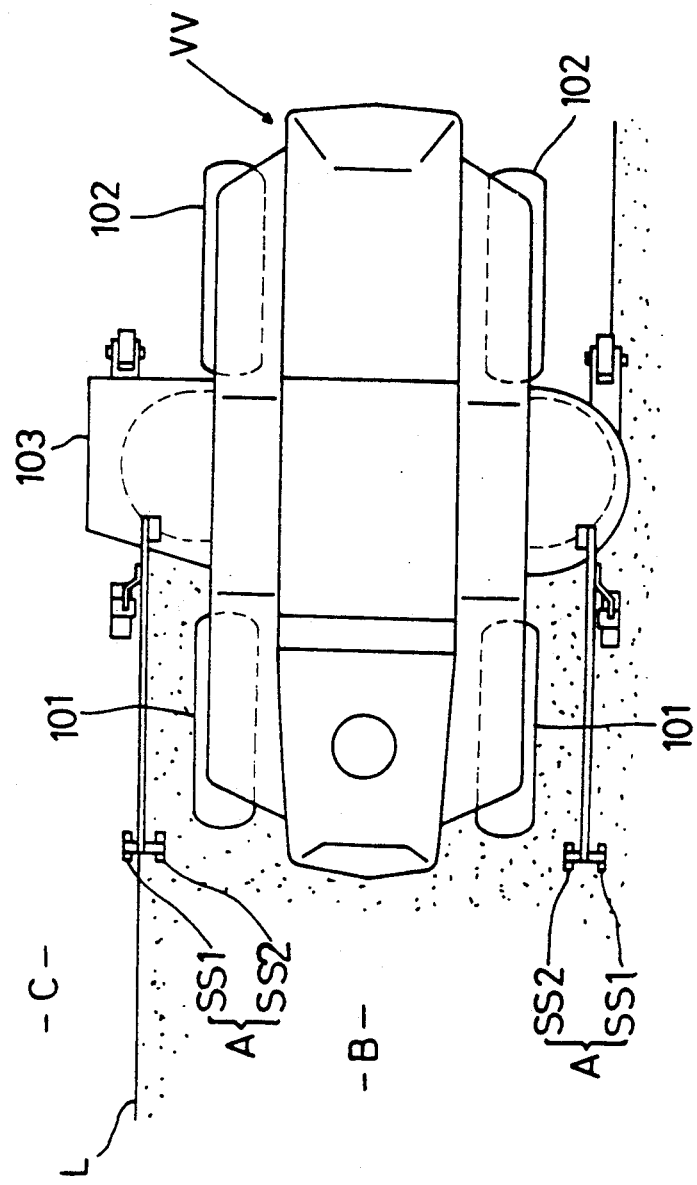
FIG. 13 is a schematic plan view of a lawn mower constituting a second embodiment of the present invention.

As shown in FIG. 13, the lawn mower comprises a vehicle VV having a pair of right and left front wheels 101 and a pair of right and left rear wheels 102, and a grass cutter 103 supported in an underslung fashion by the vehicle VV.

Figure 14:
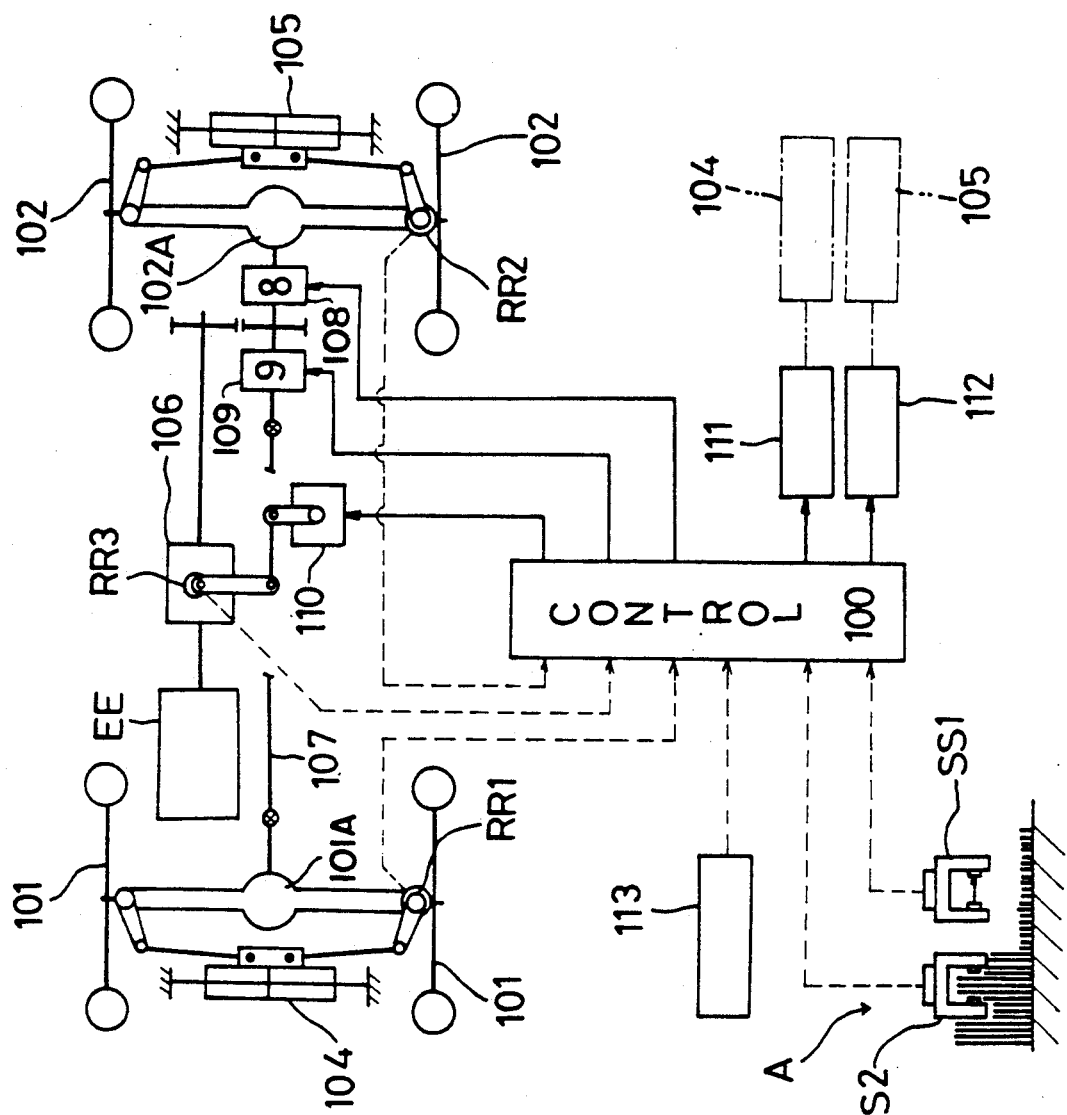
FIG. 14 is a schematic view of a control system of the lawn mower.

Referring to FIG. 14, the front wheels 101 and rear wheels 102 are steerable by steering cylinders 104 and 105, respectively. All of the four wheels are drive wheels in this example.

A hydraulic stepless transmission 106 is operatively connected to an engine EE. Part of the output of transmission 106 is input to a rear differential 102A for driving the rear wheels 102, and part of the output thereof is input through a transmission shaft 107 to a front differential 101A for driving the front wheels 101.

An auxiliary rear wheel change speed device 108 of the electromagnetic clutch type is disposed between the stepless transmission 106 and the rear differential 102A for driving the rear wheels at a higher speed than the front wheels. Further, an auxiliary front wheel change speed device 109 of the electromagnetic clutch type is disposed between the stepless transmission 106 and the transmission shaft 107 for driving the front wheels at a higher speed than the rear wheels.

In FIG. 14, number 110 indicates a change speed motor connected to the stepless transmission 106. Numbers 111 and 112 indicate electromagnetic control valves for controlling the front wheel steering cylinder 104 and rear wheel steering cylinder 105, respectively.

Reference RR3 indicates a potentiometer for detecting speeds provided by the stepless transmission 106. References RR1 and RR2 indicate potentiometers for detecting steering angles of the front wheels 101 and rear wheels 102, respectively.

As shown in FIG. 13, the lawn mower is capable of running automatically along a boundary L between an untreated area B and a treated area C, with the boundary L acting as running guide. For this purpose, the lawn mower includes the steering control system as described hereinafter.

The lawn mower may cut grass while running a spiral-like track, making a 90 degree turn from one working course to a next working course. Alternatively, the lawn mower may run in a zigzag, making a 180 degree turn from one working course to an adjacent parallel course.

Where the lawn mower is adapted to make turns automatically also, the mower includes, in addition to the steering control system, a detecting device for detecting ends of working courses and a turn control device.

The steering control system will now be described. The vehicle VV carries follower sensors A for detecting positions of the vehicle VV transversely of the boundary L, and a direction sensor 113 (see FIG. 14) using geomagnetism for detecting inclinations of the vehicle VV with respect to a reference direction set longitudinally of the boundary L. The control system includes a control unit using a microcomputer operable in response to detection data provided by the follower sensors A and direction sensor 113 and to prestored data, to output instructions to the control valves 111 and 112 for controlling the steering cylinders 104 and 105.

In other words, the control unit constitutes a steering control device 100' for automatically steering the front wheels 101 and rear wheels 102 in response to the detection data provided by the follower sensors A and direction sensor 113. By the action of the control device 100', the inclination of the vehicle VV with respect to the boundary L and its transverse displacement are both maintained within predetermined permissible ranges.

For automatically running along the boundary L, the lawn mower needs vehicle speed control means for increasing the running speed to a predetermined speed after a start command. In this embodiment, the above control unit acts also as the vehicle speed control means.

As shown in FIG. 14, each of the follower sensors A comprises a pair of right and left optical sensors SS1 and SS2 of the photo interrupt type. The vehicle VV is judged to be in a proper position where light of only the optical sensor SS2 located inwardly of the vehicle VV is interrupted by uncut grass. The vehicle VV is judged to be displaced toward the untreated area where lights of both optical sensors SS1 and SS2 are interrupted by uncut grass. The vehicle VV is judged to be displaced toward the treated area where light of either optical sensor SS1 or SS2 is not interrupted by uncut grass.

As shown in FIG. 13, the follower sensors A are distributed right and left at the front of vehicle VV. These sensors A are selectively used depending on the position of vehicle VV relative to the boundary L and the running direction of the vehicle VV.

Figure 15A:
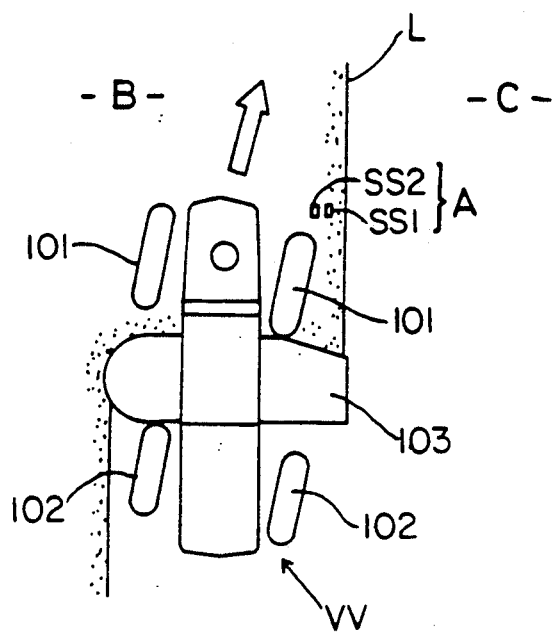
FIGS. 15A, 15B and 15C are schematic plan views showing various steering states of the lawn mower.
Figure 15B:
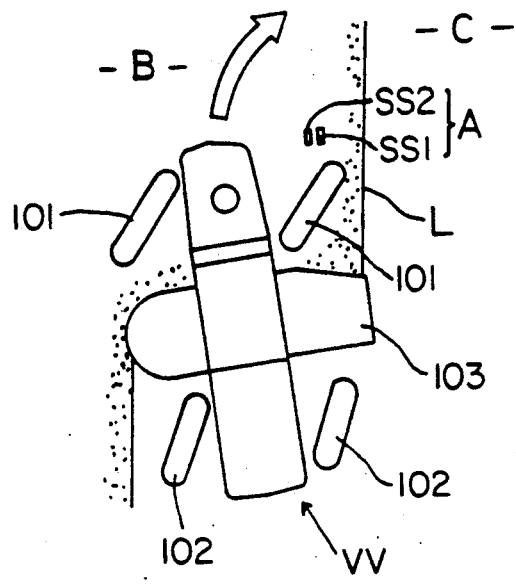
Figure 15C:
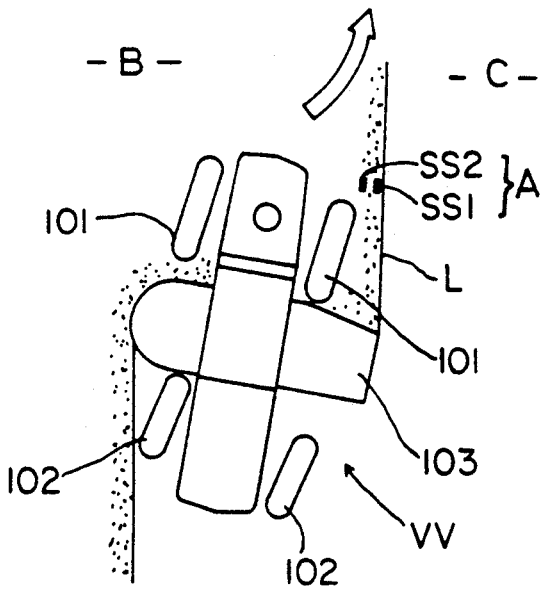

The steering control device 100', as shown in FIG. 14 and FIG. 15, will be described further. The steering control device 100' is operable only when either follower sensor A detects a sideways displacement. More particularly, when the inclination of the vehicle VV is within the predetermined range and its transverse position is outside the predetermined permissible range as shown in FIG. 15A, the control device 100' as shown in FIG. 14, selects the parallel steering mode to turn the front wheels 101 and rear wheels 102 to the same angle in a direction to make a sideways correction. When the inclination and transverse position of the vehicle VV are outside the predetermined ranges in the same direction as shown in FIG. 15B, the control device 100' as shown in FIG. 14, selects a first offset steering mode to turn the front wheels 101 and rear wheels 102 in a direction to make a sideways correction, turning the front wheels 101 to a greater angle than the rear wheels 102. When the inclination and transverse position of the vehicle VV are outside the predetermined ranges in opposite directions as shown in FIG. 15C, the control device 100', as shown in FIG. 14, selects a second offset steering mode to turn the front wheels 101 and rear wheels 102 in a direction to make a sideways correction, turning the rear wheels 102 to a greater angle than the front wheels 101. Though not shown, the turn steering mode may be selected when only the inclination is outside the permissible range.

In the first offset steering mode, the auxiliary front wheel change speed device 109 is switched to a high speed position. In the second offset steering mode, the auxiliary rear wheel change speed device 108 is switched to a high speed position. This improves steering efficiency.

Where the front and rear differentials 101A and 102A have a differential locking function, the differentials 101A and 102A may normally be locked. The differential locking may be released only for the first and second offset steering modes.

A steering control operation will be described further with reference to a flowchart outline shown in FIG. 16. This flowchart assumes that the boundary lies along the righthand side of the vehicle VV. Although not described, the turn steering mode may be selected for correcting the inclination or directional displacement of the vehicle VV.

First, checking is made whether the transverse position of the vehicle VV is within the permissible range or not. If the transverse position is outside the permissible range, checking is made whether the displacement has occurred leftward or not, namely in which direction the displacement has occurred.

Thereafter, checking is made whether there is an inclination beyond the permissible range or not, namely whether there is a directional displacement or not.

If there is no directional displacement, the parallel steering mode is selected to make a sideways correction. If there is a directional displacement, checking is made whether the displacement has occurred leftward or rightward. When the sideways displacement and the directional displacement are in the same direction, the first offset steering mode is selected for making a sideways and inclination correction. When the sideways displacement and the directional displacement are in opposite directions, the second offset steering mode is selected for making the correction.

After selecting the first offset steering mode, a step is taken to drive the front wheels 101 at high speed. Similarly, after selecting the second offset steering mode, a step is taken to drive the rear wheels 102 at high speed.

In the two described embodiments, trees and grass are used as the reference for automatic running. Where no such objects are available, the directional and sideways displacements of the working vehicle must be detected by some other means.

In the embodiment described next, the self-propelled vehicle detects the directional and sideways displacements by the principle of laser beacon. This vehicle is of course steered by the steering control system of the present invention in response to detected directional and sideways displacements. The steering control, however, is the same as in the foregoing first and second embodiments and its description will not be repeated.

Figure 18:
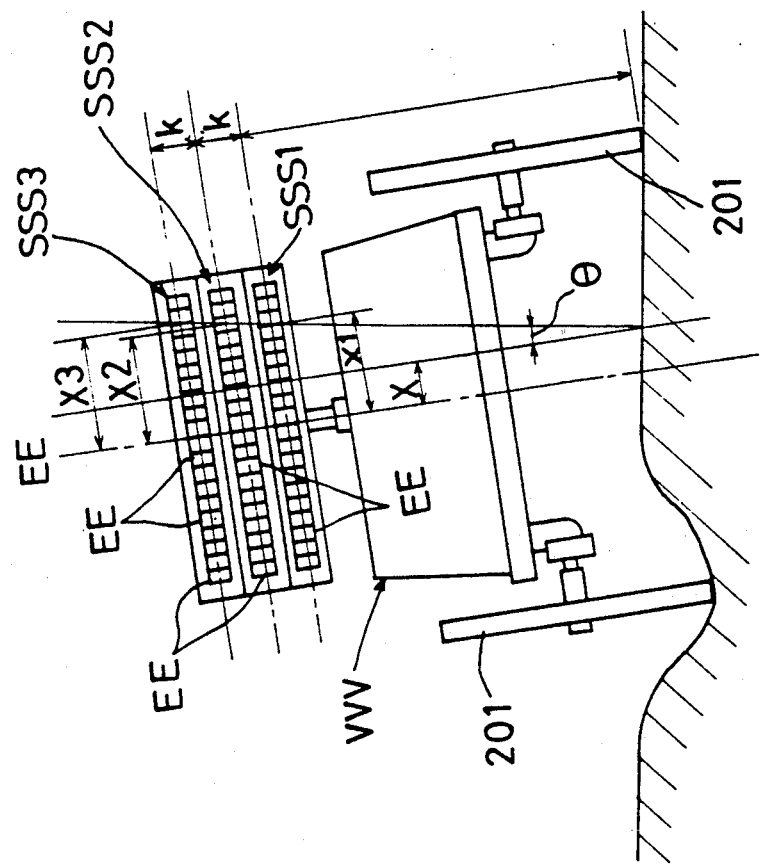
FIG. 18 is a front view of the planter showing an arrangement of the optical sensors.

As shown in FIGS. 17 and 18, the working vehicle in this embodiment is a seedling planter comprising a vehicle frame VVV having a pair of right and left front wheels 201F and a pair of right and left rear wheels 201R. The vehicle frame VVV carries a planting implement 202 (see FIG. 17) attached to a rear end thereof to be adjustable to a horizontal posture.

The vehicle frame VVV carries three optical sensors SSS1, SSS2 and SSS3 at an upper forward position thereof for detecting light receiving positions transversely of the vehicle frame VVV. The sensors SSS1, SSS2 and SSS3 are vertically arranged at intervals of a predetermined distance k, with light receiving faces thereof directed forwardly of the vehicle frame VVV. A laser emitter LE is installed on the ground for emitting a vertically diverging laser beam LB toward the light receiving faces of sensors SSS1, SSS2 and SSS3 (see FIG. 17). Rolling of the vehicle frame VVV is detected on the basis of light receiving position data provided by the sensors SSS1, SSS2 and SSS3. On the basis of the detected rolling, the light receiving positions of the optical sensors are corrected, and a direction 4 as defined in FIG. 19 and a transverse displacement X of vehicle frame VVV with respect to the laser beam emitting direction are detected.

A rolling control is effected to maintain the planting implement 202 in a fixed posture, for example, a horizontal posture in response to the rolling detection data, regardless of the rolling of vehicle frame VVV. The seedling planter is guided to run automatically along the laser beam LB in response to the direction $\psi$ and displacement X relative to the emitting direction of laser beam LB.

Figure 19:
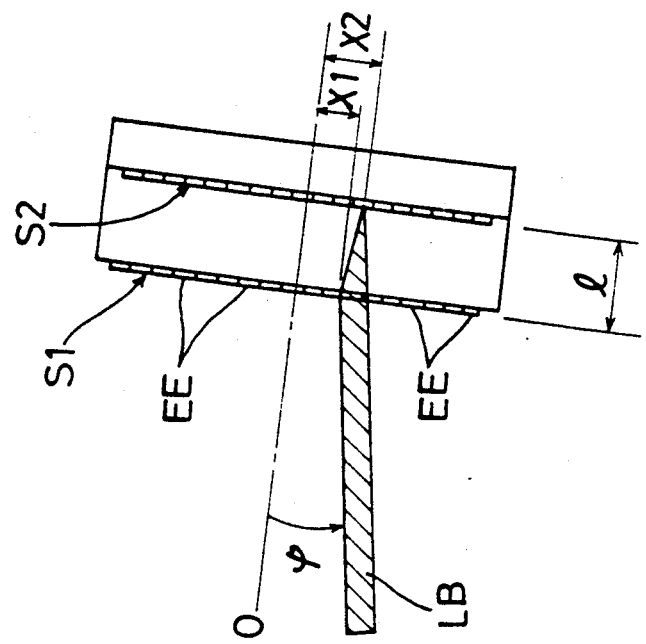
FIG. 19 is a plan view of the optical sensors.

As shown in FIGS. 17 through 19, each of the optical sensors SSS1, SSS2 and SSS3 includes a plurality of light receiving elements EE comprising photodiodes, phototransistors or the like arranged transversely of the vehicle frame VVV. The light receiving elements EE have a center position coinciding with a longitudinal centerline 0 of the vehicle frame VVV.

A first optical sensor SSS1 which is the lowermost one of the optical sensors is located at a predetermined distance h from ground contacting surfaces of the wheels 201. A second optical sensor SSS2 is located above the first optical sensor SSS1 by the predetermined distance k and rearwardly thereof by a predetermined distance 1. A third optical sensor SSS3 located at an uppermost position is spaced from the second optical sensor SSS2 by the distance k and has its light receiving face flush with that of the first optical sensor SSS1. Rolling of the vehicle results in a relative transverse displacement between light receiving positions of the vertical arranged pair of first and second optical sensors having the light receiving faces on the same plane. A directional displacement of the vehicle relative to the emitting direction of laser beam LB results in a relative transverse displacement between the light receiving positions of the fore and aft pair of first and second optical sensors having the light receiving faces displaced in the fore and aft direction.

As shown in FIG. 17, the laser emitter LE includes a light source 203 for emitting the laser beam, and a scanner 204 consisting of a vertically oscillatable reflecting mirror for spreading the laser beam to a predetermined vertical width. Thus the laser beam LB having the vertical width is directed toward the sensors SSS1, SSS2 and SSS3.

The laser beam LB emitted from the laser emitter LE has such a horizontal width as to cover two light receiving elements EE in each of the optical sensors SSS1, SSS2 and SSS3 simultaneously. When the laser beam LB strikes a mid-position between two light receiving elements EE, the mid-position of the light receiving elements EE covered by the laser beam LB is regarded as the light receiving position. When the laser beam LB strikes one light receiving element EE only, then the position of this light receiving element EE is regarded as the light receiving position. The resolution of the light receiving position is set to about half of the space with which the plurality of light receiving elements EE are arranged transversely. Thus, the precision with which the light receiving position is judged exceeds the number of light receiving elements EE arranged transversely.

Figure 20:
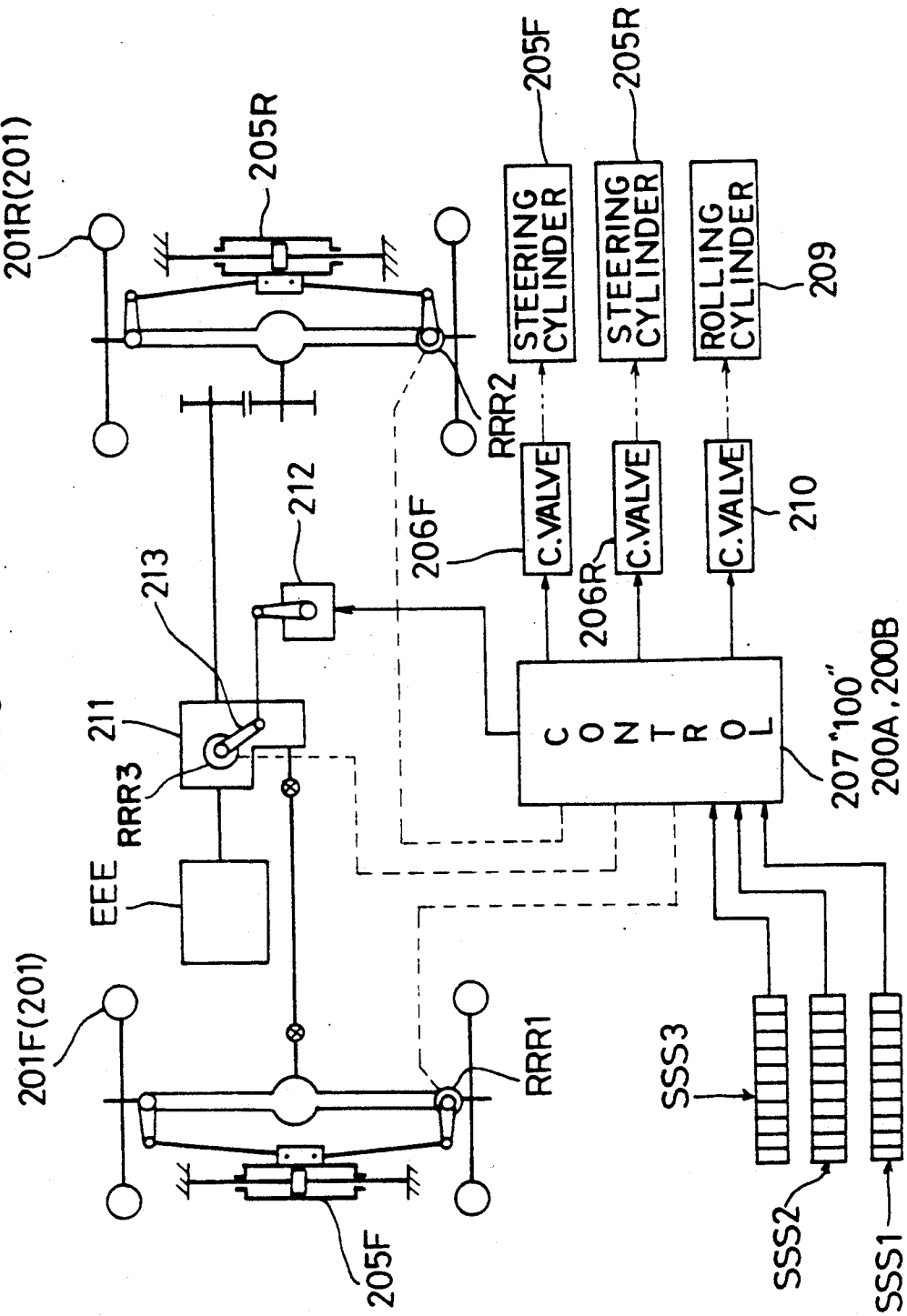
FIG. 20 is a block diagram of a control system.

Referring to FIG. 20, the seedling planter comprises power steering means including hydraulic cylinders 205F and 205R for turning the front and rear wheels 201F and 201R, respectively. The four wheels are driven by an engine EEE.

The planter further comprises a control unit 207 acting as rolling detecting means 200A for detecting rolling of the vehicle frame VVV in response to the light receiving position data provided by the pair of lower and upper optical sensors SSS1 and SSS3, direction detecting means 200B for detecting the direction $\psi$ of the vehicle frame VVV in response to the light receiving position data provided by the pair of fore and aft optical sensors SSS1 and SSS2, and steering control means 100" operable in response to the detected direction $\psi$ and displacement X to actuate control valves 206F and 206R connected to the hydraulic cylinders 205F and 205R, respectively, for controlling the planter to automatically run along the laser beam LB. Still further, the planter comprises a hydraulic cylinder 209 of hydraulic rolling mechanism 208 for correcting the posture of planting implement 202 in response to the rolling or inclination $\theta$ of the vehicle frame VVV detected by the rolling detecting means 200A, and a control valve 210 for controlling the cylinder 209.

In FIG. 20, number 211 indicates a hydraulic stepless transmission for changing the running speed. Number 212 indicates a change speed motor for controlling a change speed arm 213 of the transmission 211 to cause the planter to run at a selected speed. References RRR1 and RRR2 indicate potentiometers for detecting steering positions of the front wheels 201F and rear wheels 201R, respectively. Reference RRR3 indicates a potentiometer for detecting change speed positions of the transmission 211.

The rolling detecting means 100A for detecting the rolling of vehicle frame VVV in response to the light receiving position data provided by the two optical sensors SSS1 and SSS2 will be described next.

When the vehicle frame VVV includes as shown in FIG. 18, the upper optical sensor SSS3 has a light receiving position X3 more outwardly with respect to the vehicle frame VVV than a light receiving position X1 of the lower optical sensor SSS1. The rolling or inclination $\theta$ of the vehicle frame VVV is derived from the following equation (i) on the basis of the light receiving positions X1 and X3 of the optical sensors SSS1 and SSS3, the height h at which the optical sensor SSS1 is attached to the vehicle frame VVV, and the distance 2k between the two optical sensors SSS1 and SSS3:

$$\theta = \tan^{-1}\left(\frac{X3 - X1}{2k}\right) \quad \text{(i)}$$

Accordingly, a precise transverse displacement X of the vehicle frame VVV relative to the laser beam LB is derived from the following equation (ii):

$$X = \frac{X1 - h \cdot \sin\theta}{\cos\theta} \quad \text{(ii)}$$

The control valve 210 for the rolling hydraulic cylinder 209 is operated on the basis of the inclination $\theta$ of vehicle frame VVV derived from the equation (i), thereby to adjust the planting implement to the horizontal posture.

The direction $\psi$ of vehicle frame VVV with respect to the emitting direction of laser beam LB is derived from the following equation (iii) on the basis of light receiving positions X1 and X2 of the first and second optical sensors SSS1 and SSS2 (FIG. 19):

$$\psi = \tan^{-1}\left(\frac{X2 - X1}{l}\right) \quad \text{(iii)}$$

The planter is steered in the parallel steering mode by turning the front and rear wheels 201F and 201R in the same direction so that the displacement X derived from the equation (ii) becomes zero. As a result, the planter is moved transversely to a correct position where the lower optical sensor SSS1 receives the laser beam LB at the longitudinal centerline 0 of the vehicle frame VVV. Further, the planter is steered in the four wheel steering mode by turning the front and rear wheels 201F and 201R in opposite directions so that the direction $\theta$ derived from the equation (iii) becomes zero. As a result, the planter is adjusted to a correct facing direction where the pair of fore and aft optical sensors SSS1 and SSS2 receive the laser beam LB at the same position. Thus, the planter is steered to run automatically along the laser beam LB.

In the above embodiment, the three optical sensors constitute a unit with the third sensor SSS3 flush with the first sensor SSS1 added to the pair of first, lower sensor SSS1 and second, upper sensor SSS2, in order to eliminate errors in the detected direction due to the rolling of the vehicle frame. However, the third sensor SSS3 may be omitted.

What is claimed is:

1. A steering control system for a self-propelled working vehicle having steerable front and rear wheels and movable along a propelling target line, said steering control system comprising:

direction detecting means for detecting an inclination of vehicle running direction relative to said target line, said inclination relative to said target line being a directional error;

sideways error detecting means for detecting a distance between said vehicle and said target line, said distance being a sideways error; and steering control means for steering said front and rear wheels in response to signals received from said direction detecting means and said sideways error detecting means, said steering control means comprising means for steering said front and rear wheels to the same steering angle in opposite directions in only a turn steering mode and for steering said front and rear wheels to the same steering angle in a same direction in only a parallel steering mode;

wherein, when detection by said direction detecting means of said directional error of said vehicle and detection by said sideways error detecting means of said sideways error of said vehicle take place simultaneously and said front wheels are directionally displaced from said target line by a large amount compared with the rear wheels, said steering control means further increases steering angle of said front wheels by a predetermined front wheel offset with respect to the positions of said front and rear wheels in said parallel steering mode; and when detection by said direction detecting means of said directional error of said vehicle and detection by said sideways error detecting means of said sideways error of said vehicle take place simultaneously and said rear wheels are directionally displaced from said target line by a large amount compared with said front wheels, said steering control means further increases the steering angle of said rear wheels by a predetermined rear wheel offset with respect to positions of said front and rear wheels in said parallel steering mode; and wherein said steering control system detects a presence of obstacles laterally spaced from the vehicle and thereby corrects deviations from the target line.

2. A steering control system as claimed in claim 1 wherein said steering control means steers said front and rear wheels in said turn steering mode when only a signal of directional error of said vehicle is received from the direction detecting means, and wherein said steering control means steers said front and rear wheels in said parallel steering mode when only a signal of sideways error is received from said sideways error detecting means.

3. A steering control system as claimed in claim 2 wherein at least one of a front and a rear wheel offset amount is determined in accordance with the signal received from the sideways error detecting means.

4. A steering control system as claimed in claim 1 wherein, when only a signal of directional error is received from the direction detecting means, the steering control means steers at least one of the front and rear wheels in the turn steering mode.

5. A steering control system as claimed in claim 1 wherein, when only a signal of sideways error is received from the sideways error detecting means, the steering control means steers the front and rear wheels in the parallel steering mode.

6. A steering control system for a self-propelled working vehicle having steerable front and rear wheels and movable along a propelling target line disposed by a ground path, said steering control system comprising:

light beam emitting means installed on the ground path;

first and second sensor means vertically arranged on the vehicle for detecting a light beam, emitted from said light beam emitting means, from a position transverse of the vehicle;

directional error and sideways error calculating means for detecting, in response to said first and second sensor means, a directional error, said directional error being in inclination of vehicle running direction relative to said target line, and a sideways error, said sideways error being a distance between said vehicle and said target line, respectively with said directional and sideways error calculated from data received from said first and second sensor means;

steering control means for steering said front and rear wheels in response to signals received from said directional error calculating means and said sideways error calculating means, said steering control means comprising a means for steering said front and rear wheels to the same steering angle in opposite directions in only a turn steering mode and for steering said front and rear wheels to the same steering angle in a same direction in only a parallel steering mode;

wherein, when detection by said direction error calculating means of said directional error of said vehicle and detection by said sideways error calculating means of said sideways error of said vehicle take place simultaneously and said front wheels are directionally displaced from said target line by a large amount compared with the rear wheels, said steering control means further increases a steering angle of said front wheels by a predetermined front wheel offset with respect to the positions of said front and rear wheels in said parallel steering mode; and when detection by said direction error calculating means of said directional error of said vehicle and detection by said sideways error calculating means of said sideways error of said vehicle take place simultaneously and said rear wheels are directionally displaced from said target line by a large amount compared with said front wheels, said steering control means further increases a steering angle of said rear wheels by a predetermined rear wheel offset with respect to the positions of said front and rear wheels in said parallel steering mode.

7. A steering control system as claimed in claim 6 wherein said steering control means steers said front and rear wheels in said turn steering mode when only a signal of directional error of said vehicle is received from the direction detecting means, and wherein said steering control means steers said front and rear wheels in said parallel steering mode when only a signal of sideways error is received from said sideways error detecting means.

8. A steering control system as claimed in claim 7 wherein one of a front and a rear wheel offset amount is determined in accordance with a signal received from sideways error calculating means.

9. A steering control system as claimed in claim 6 wherein, when only a signal of directional error is received from the directional error calculating means, the steering control means steers the front and rear wheels in the turn steering mode.

10. A steering control system as claimed in claim 6 wherein, when only a signal of sideways error is received from the sideways error calculating means, the steering control means steers the front and rear wheels in the parallel steering mode.

11. A steering control system for automatically propelling of self-propelled working vehicle having steerable front and rear wheels and being movable along a running guide, said system comprising:

wheel drive means for driving at least one of the front and rear wheels;

direction detecting means for detecting a directional error of said vehicle, said directional error being an inclination of vehicle running direction relative to said running guide;

sideways error detecting means for detecting a distance between said vehicle and said running guide, said distance being a sideways error; and steering control means for steering said front and rear wheels in response to signals received from said direction detecting means and said sideways error detecting means;

wherein, when both said directional and sideways errors exceed predetermined permissible ranges, said steering control means steers said front and rear wheels in an offset steering mode so as to steer said front and rear wheels to different steering angles in the same direction, said front and rear wheels being steered in only a first direction which corrects said sideways error, with said front wheels steered to a greater angle than said rear wheels, where said directional error and said sideways error occur in a same direction, and said front and rear wheels being steered in only the first direction to correct said sideways error with said rear wheels steered to a greater angle than said front wheels, where said directional and sideways errors occur in opposite directions; and wherein said steering control system detects a presence of objects laterally spaced from the vehicle and thereby corrects deviations from a target line.

12. A method for steering a self-propelled vehicle having steerable front and rear wheels and moveable along a target line, said method comprising the steps of:

detecting an inclination of vehicle running direction relative to said target line, said inclination relative to said target line being a directional error;

detecting a distance between said vehicle and said target line, said distance being a sideways error;

steering said front and rear wheels in response to said directional and sideways error, said front and rear wheel being steerable to the same steering angle in opposite directions in only a turn steering mode and to the same steering angle in a same direction in only a parallel steering mode;

further increasing said steering angle of said front wheels by a predetermined front wheel offset with respect to the positions of said front and rear wheels in said parallel steering mode when said directional and sideways errors are detected simultaneously and said front wheels are directionally displaced from said target line by a large amount compared with said rear wheels; and further increasing the steering angle of said rear wheels by a predetermined rear wheel offset with respect to the positions of said front and rear wheels in said parallel steering mode when said directional and sideways errors are detected simultaneously and said rear wheels are directionally displaced from said target line by a large amount compared with said front wheels;

wherein said steering system correcting deviations from the target line by detecting a presence of obstacles laterally spaced from the vehicle.

13. A method for steering a self-propelled working vehicle having steerable front and rear wheels and movable along a propelling target line disposed on a ground path, said method comprising the steps of:

detecting light beams, using first and second sensor means vertically arranged on said vehicle, emitted from light beam emitting means installed on the ground path;

detecting an inclination of vehicle running direction relative to said target line in response to said detected light beams, said inclination relative to said target line being a directional error;

detecting a distance between said vehicle and said target line in response to said detected light beam, said distance being a sideways error;

steering said front and rear wheels in response to said directional and sideways error; said front and rear wheel being steerable to the same steering angle in opposite directions in only a turn steering mode and to the same steering angle in a same direction in only a parallel steering mode;

further increasing said steering angle of said front wheels by a predetermined front wheel offset with respect to the positions of said front and rear wheels in said parallel steering mode when said directional and sideways errors are detected simultaneously and said front wheels are directionally displaced from said target line by a large amount compared with said rear wheels; and further increasing the steering angle of said rear wheels by a predetermined rear wheel offset with respect to the positions of said front and rear wheels in said parallel steering mode when said directional and sideways errors are detected simultaneously and said rear wheels are directionally displaced from said target line by a large amount compared with said front wheels.

14. A method for automatically propelling a self-propelled working vehicle having steerable front and rear wheels and moveable along a running guide, said method comprising the steps of:

driving at least one of the front and rear wheels with a wheel drive means;

detecting an inclination of vehicle running direction relative to said running guide, said inclination relative to said running guide being a directional error;

detecting a distance between said vehicle and said running guide, said distance being a sideways error;

steering said front and rear wheels in response to said directional and sideways error; and steering said front and rear wheels in an offset steering mode so as to steer said front and rear wheels to different steering angles in the same direction, said front and rear wheels being steered in only a first direction which corrects the sideways error with said front wheels being steered to a greater angle than said rear wheels, and said directional and said sideways error occur in the same direction, and to steer said front and rear wheels in only the first direction to correct sideways error with said rear wheels steered to a greater angle than said front wheels, where said directional and sideways errors occur in opposite directions, said steering occurring when said directional and said sideways errors exceed predetermined permissible ranges, said steering control system avoiding obstacles laterally spaced from the vehicle by detecting a presence of the obstacles and thereby correcting deviations from a target line.

* * * * *